United States Patent
Yokoyama et al.

(10) Patent No.: US 11,200,056 B2
(45) Date of Patent: Dec. 14, 2021

(54) PARALLEL UNION CONTROL DEVICE, PARALLEL UNION CONTROL METHOD, AND STORAGE MEDIUM

(71) Applicant: NEC CORPORATION, Tokyo (JP)

(72) Inventors: Harumichi Yokoyama, Tokyo (JP); Takuya Araki, Tokyo (JP); Haoran Li, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/967,866

(22) PCT Filed: Feb. 5, 2019

(86) PCT No.: PCT/JP2019/004004
§ 371 (c)(1),
(2) Date: Aug. 6, 2020

(87) PCT Pub. No.: WO2019/156060
PCT Pub. Date: Aug. 15, 2019

(65) Prior Publication Data
US 2021/0049012 A1    Feb. 18, 2021

(30) Foreign Application Priority Data
Feb. 8, 2018  (JP) .............................. JP2018-020953

(51) Int. Cl.
*G06F 16/2453*    (2019.01)
*G06F 9/30*    (2018.01)
(Continued)

(52) U.S. Cl.
CPC ...... *G06F 9/30036* (2013.01); *G06F 9/30014* (2013.01); *G06F 9/30032* (2013.01);
(Continued)

(58) Field of Classification Search
None
See application file for complete search history.

(56) References Cited

U.S. PATENT DOCUMENTS 5,193,125 A * 3/1993 Mahoney ............. G06K 9/4638
382/158
5,590,345 A * 12/1996 Barker .................... G06F 7/483
712/11
(Continued)

FOREIGN PATENT DOCUMENTS

JP    61-139881 A    6/1986
JP    02-227725 A    9/1990
(Continued)

OTHER PUBLICATIONS

Written Opinion for PCT/JP2019/004004, dated Apr. 9, 2019.
International Search Report for PCT/JP2019/004004, dated Apr. 9, 2019.

*Primary Examiner* — Hyun Nam
(74) *Attorney, Agent, or Firm* — Sughrue Mion, PLLC

(57) ABSTRACT

A parallel union control device includes: at least one memory storing a set of instructions; and at least one processor configured to execute the set of instructions to cause each of the plurality of arithmetic units included in an parallel computer including a vector register to: successively compare input elements of a pair of input sets to undergo union processing, the pair being stored in an input operand register in the vector register; select one of the input elements as an output element of an output set, based on a comparison result; and store the output element into an output operand register in the vector register; shift a pointer pointing to the input element; load the input sets into the input operand register from a memory; store the output sets
(Continued)

into the memory from the output operand register; and determine whether union processing performed in parallel is ended.

20 Claims, 21 Drawing Sheets

(51) Int. Cl.
    *G06F 9/38*         (2018.01)
    *G06F 17/16*       (2006.01)

(52) U.S. Cl.
    CPC ...... *G06F 9/30043* (2013.01); *G06F 9/30101* (2013.01); *G06F 9/3885* (2013.01); *G06F 17/16* (2013.01)

(56) References Cited

U.S. PATENT DOCUMENTS

| | | | |
|---|---|---|---|
| 2019/0050371 A1* | 2/2019 | Araki | G06F 17/16 |
| 2019/0238564 A1* | 8/2019 | Rao | G06F 16/183 |
| 2021/0081491 A1* | 3/2021 | Daido | G06N 20/00 |

FOREIGN PATENT DOCUMENTS

| | | |
|---|---|---|
| JP | 09-26872 A | 1/1997 |
| JP | 2006-163565 A | 6/2006 |
| JP | 2011-233012 A | 11/2011 |
| JP | 2016-115092 A | 6/2016 |
| JP | 2017-539013 A | 12/2017 |
| WO | 03/091872 A1 | 11/2003 |

* cited by examiner

Fig.19

4000 MULTI-UNION-CONTROL DEVICE

400 PARALLEL UNION CONTROL DEVICE
- 401 ELEMENT COMPARISON CONTROL UNIT
- 402 REGISTER INPUT-OUTPUT UNIT
- 403 END DETERMINATION UNIT
- 404 SET DIVISION-COMBINATION UNIT
- 405 NUMBER-OF-DIVISIONS DETERMINATION UNIT

4010 PROCESS COMPLETION DETERMINATION UNIT

4020 SET PAIR GENERATION UNIT

PARALLEL UNION CONTROL DEVICE, PARALLEL UNION CONTROL METHOD, AND STORAGE MEDIUM

CROSS REFERENCE TO RELATED APPLICATIONS

This application is a National Stage of International Application No. PCT/JP2019/004004 filed Feb. 5, 2019, claiming priority based on Japanese Patent Application No. 2018-020953 filed Feb. 8, 2018, filed on Feb. 8, 2018, the disclosure of which is incorporated herein in its entirety by reference.

TECHNICAL FIELD

The present invention relates to a technology of performing union processing on sorted sets in parallel.

BACKGROUND ART

A sparse matrix-sparse vector product is receiving attention as a kernel operation in many graph algorithms. For example, graph algorithms include connected component extraction and a shortest path problem. For example, the connected component extraction determines (extracts) a set of mutually reachable vertices (such as a community) from a graph representing a relation between users (such as whether the users are friends) of a social networking service (SNS) such as Twitter (registered trademark) or Facebook (registered trademark). On the other hand, for example, the shortest path problem is a problem (path search) of finding the shortest path from a vertex to another vertex from a graph indicating a relation between points on a map and roads connecting the points.

A graph search is a matrix operation. A structure of a graph is represented by a sparse matrix. A graph search is represented by a product of a sparse matrix and a sparse vector, that is, a sparse matrix-sparse vector product.

In other words, a sparse matrix-sparse vector product is a product operation of a sparse matrix and a sparse vector. The sparse matrix and the sparse vector have a format holding an index and a value of a non-zero element. By using such a sparse matrix (sparse vector) representation, data most of which are zero can be stored by a small-capacity memory.

However, a load of processing of taking a union of a plurality of sorted sets (hereinafter referred to as union processing) is particularly heavy in a sparse matrix-sparse vector product. The union processing will be described later.

Union processing on sorted sets frequently appears in a graph algorithm. For example, such a graph algorithm appears in processing of taking a join of database tables. A "sorted set" refers to a set in which elements of the set are arranged in ascending order or descending order. "Union processing on sorted sets" refers to processing of returning, as an output, output elements that includes a sorted set including input elements of input sets and also not including other elements in a state of eliminating duplicate input elements. The number of input sorted sets may be three or more.

Merge processing is known as processing closely resembling the union processing. "Merge processing on sorted sets" refers to processing returning, as an output, output elements that includes a sorted set including input elements of input sets and also not including other elements in a state of leaving duplicate input elements.

As is known in this technical field, a parallel computer such as a vector computer can accelerate computation processing. A vector computer is a computer characterized by including a register (vector register) capable of storing a plurality of numeric values and including vector arithmetic units executing similar computations on the numeric values in the register in parallel. A vector arithmetic unit includes a plurality of arithmetic units. A vector computer is expected to be able to execute higher speed computation processing compared with a common processor by efficiently utilizing vector arithmetic units.

In other words, a vector computer is a computer capable of performing a vector operation [single instruction multiple data (SIMD)]. SIMD is one of design specifications for performing parallel processing in a computer and a microprocessor. SIMD is a method of simultaneously applying one instruction to a plurality of pieces of data and processing the data in parallel. Such a processing method is referred to as a vector operation, vector processing, or the like.

Various related arts related to the present invention are known.

For example, PTL 1 discloses a parallel merge-sort processing device enabling parallelization of merge processing with two pairs of sorted partial data sequences as inputs. The parallel merge-sort processing device disclosed in this PTL 1 includes a merge processing parallel processor, a data sequence pair division parallel processor, a sort processing parallel processor, a management processor, and a data storage area. The merge processing parallel processor includes a plurality of processors and is capable of executing a plurality of tasks simultaneously in parallel. The data sequence pair division parallel processor divides two pairs of sorted data sequences into a predetermined number of partial data sequences and returns the resulting partial data sequences to the management processor. The sort processing parallel processor sorts an unsorted data sequence existing in a specified area.

PTL 1 enhances parallelism by dividing two pairs of sorted data sequences into a plurality pairs of partial data sequences. By dividing a pair of data sequences being inputs to a merge into two, two sets of input data sequence pairs are acquired, and performing a regular-order merge and a reverse-order merge on each pair allows a plurality of processors to perform processing simultaneously. By dividing a pair of data sequences into four, four sets of input data sequences are acquired, and performing a regular-order merge and a reverse-order merge on each set allows a plurality of processors to perform processing simultaneously.

PTL 2 discloses a sort processing device aiming at acceleration of sort processing and also enhancing a cache hit rate. In the sort processing device disclosed in PTL 2, when an intra-block sort is completed for every block, an inter-block merge processing unit merges the blocks. First, the inter-block merge processing unit generates a data sequence with minimum values in N intra-block sorted blocks. Next, the inter-block merge processing unit sorts the generated data sequence. Then, the inter-block merge processing unit outputs, onto a main storage, the minimum value of the sorted data sequence as the minimum value of sort result data. The inter-block merge processing unit determines whether data with a next minimum value exist in a block to which the output data belong and when data with the minimum value exist, inserts the data into the data sequence of minimum values and also repeatedly executes the processing of sorting the data sequence of minimum values and the subsequent processing.

Further, the inter-block merge processing unit repeats insertion of a next smallest value into the data sequence of minimum values from a block to which output data belong and output of the minimum value in the data sequence to a main storage device. When every block becomes empty as a result of repetition, sorting of data to be sorted is completed.

PTL 3 discloses a merge processing device capable of achieving efficient record input. The merge processing device disclosed in PTL 3 includes an arrangement conversion unit, an input unit, a storage unit, and a record sequence selection unit. A plurality of record sequences each of which including a plurality of sorted records are input to the arrangement conversion unit. The arrangement conversion unit divides the plurality of input record sequences into record blocks each of which including at least one record and changes an order of a plurality of records included in each record block in such a way that a prediction record placed at the rear end of the records is positioned in front of the currently placed position. The record sequence selection unit selects a record sequence acquired from the arrangement conversion unit by the input unit, based on a prediction record included in each of the plurality of record blocks. The record sequence selected by the record sequence selection unit is acquired from the arrangement conversion unit by the input unit after acquisition of the current record sequence in the input unit is completed.

PTL 4 discloses a device, a method, and a program for sorting an array including many elements. PTL 4 performs merge-sort processing on an array including many pieces of data by use of a multiway merge. In a multiway merge, a plurality of input sequences are merged and one output sequence is finally generated. At that time, the two-way merge is repeatedly executed. In PTL 4, merge processing is executed in parallel by using an SIMD instruction. When a sort is performed in ascending order in PTL 4, a pair of the tops of input sequences are compared and are arranged in an output sequence in ascending order of value.

PTL 5 discloses a device and a method for executing a conflict detection operation. In the method disclosed in PTL 5, first, data elements of a first set are stored in a first source vector register, and data elements of a second set are stored in a second source vector register. Subsequently, each data element in the first source register is compared with a specified set of data elements in the second source register. The comparison result is stored in a destination register.

CITATION LIST

Patent Literature

PTL 1: International Application Publication No. WO 2003/091872
PTL 2: Japanese Unexamined Patent Application Publication No. 2006-163565
PTL 3: Japanese Unexamined Patent Application Publication No. 2011-233012
PTL 4: Japanese Unexamined Patent Application Publication No. 2016-115092
PTL 5: Japanese Translation of PCT International Application Publication No. 2017-539013

SUMMARY OF INVENTION

Technical Problem

The aforementioned related arts have problems as described below.

Every one of PTLs 1 to 4 merely describes merge processing. On the other hand, PTL 5 simply discloses a technology of detecting a conflict by comparing two data elements. Further, a problem in execution of a sparse matrix-sparse vector product in a parallelized manner by use of a parallel computer is not recognized in any of PTLs 1 to 5.

Specifically, PTL 1 simply discloses simultaneous and parallel execution of a plurality of tasks and a parallel merge-sort processing device enhancing parallelism by dividing two pairs of sorted data sequences into a plurality of partial data sequences.

PTL 2 merely discloses a sort processing device outputting the minimum value in a sorted data sequence as the minimum value of sort result data to a main storage device, determining whether data with a next minimum value exist in a block to which the output data belong, when such data exist, inserting the data into a data sequence of minimum values, and completing the processing when all blocks become empty.

PTL 3 merely discloses a merge processing device starting processing of achieving efficient record input by selecting a record sequence before acquisition of all records included in a record block, based on a prediction record.

PTL 4 merely handles merging a plurality of arrays. In PTL 4, a problem in execution of a high-speed sparse matrix-sparse vector product by use of a parallel computer such as vector processing (SIMD) is not recognized.

PTL 5 simply discloses a method and a device for executing conflict detection.

An object of the present invention is to resolve the aforementioned problems and provide a parallel union control device and the like enabling high-speed execution of union processing on sorted sets by use of a parallel computer.

Solution to Problem

A parallel union control device according to an aspect of the present invention is a parallel union control device that, by use of a parallel computer including N arithmetic units (where N is an integer equal to or more than 2) and a vector register, causes 2N input sets each of which being a sorted set to undergo union processing in parallel for each pair and causes N output sets each of which being a sorted set to be output, the parallel union control device including: an element comparison control means for causing each of the N arithmetic units to successively compare input elements of a pair of input sets to undergo union processing, the pair being stored in an input operand register in the vector register, select one of the input elements as an output element of an output set, based on a comparison result, and store the output element into an output operand register in the vector register, and also shifting a pointer pointing to the input element; a register input-output means for loading the 2N input sets into the input operand register from a memory and also storing the N output sets into the memory from the output operand register; and an end determination means for determining whether union processing performed in parallel is ended.

A parallel union control method according to an aspect of the present invention is a parallel union control method for, by use of a parallel computer including N arithmetic units (where N is an integer equal to or more than 2) and a vector register, causing 2N input sets each of which being a sorted set to undergo union processing in parallel for each pair and causing N output sets each of which being a sorted set to be output, the parallel union control method performing, by an information processing device: element comparison control of causing each of the N arithmetic units to successively compare input elements of a pair of input sets to undergo union processing, the pair being stored in an input operand register in the vector register, select one of the input elements as an output element of an output set, based on a comparison result, and store the output element into an output operand register in the vector register, and also shifting a pointer pointing to the input element; register input-output of loading the 2N input sets into the input operand register from a memory and also storing the N output sets into the memory from the output operand register; and end determination of determining whether union processing performed in parallel is ended.

A storage medium according to an aspect of the present invention stores a parallel union control program causing a computer to, by use of a parallel computer including N arithmetic units (where N is an integer equal to or more than 2) and a vector register, perform union processing on 2N input sets each of which being a sorted set in parallel for each pair, and output N output sets each of which being a sorted set, the parallel union control program causing the computer to execute: element comparison control processing of causing each of the N arithmetic units to successively compare input elements of a pair of input sets to undergo union processing, the pair being stored in an input operand register in the vector register, select one of the input elements as an output element of an output set, based on a comparison result, and store the output element into an output operand register in the vector register, and also shifting a pointer pointing to the input element; register input-output processing of loading the 2N input sets into the input operand register from a memory and also storing the N output sets into the memory from the output operand register; and end determination processing of determining whether union processing performed in parallel is ended.

Furthermore, an aspect of the present invention is also provided by the program stored in the aforementioned storage medium.

Advantageous Effects of Invention

The present invention enables high-speed execution of union processing on sorted sets by use of a parallel computer.

BRIEF DESCRIPTION OF DRAWINGS

FIG. 19 is a block diagram illustrating a configuration of a multi-union-control device according to the fifth example embodiment of the present invention.

EXAMPLE EMBODIMENT

Underlying Technology

Prior to description of example embodiments of the present invention, several concepts required for the description will be described.

Figure 1:
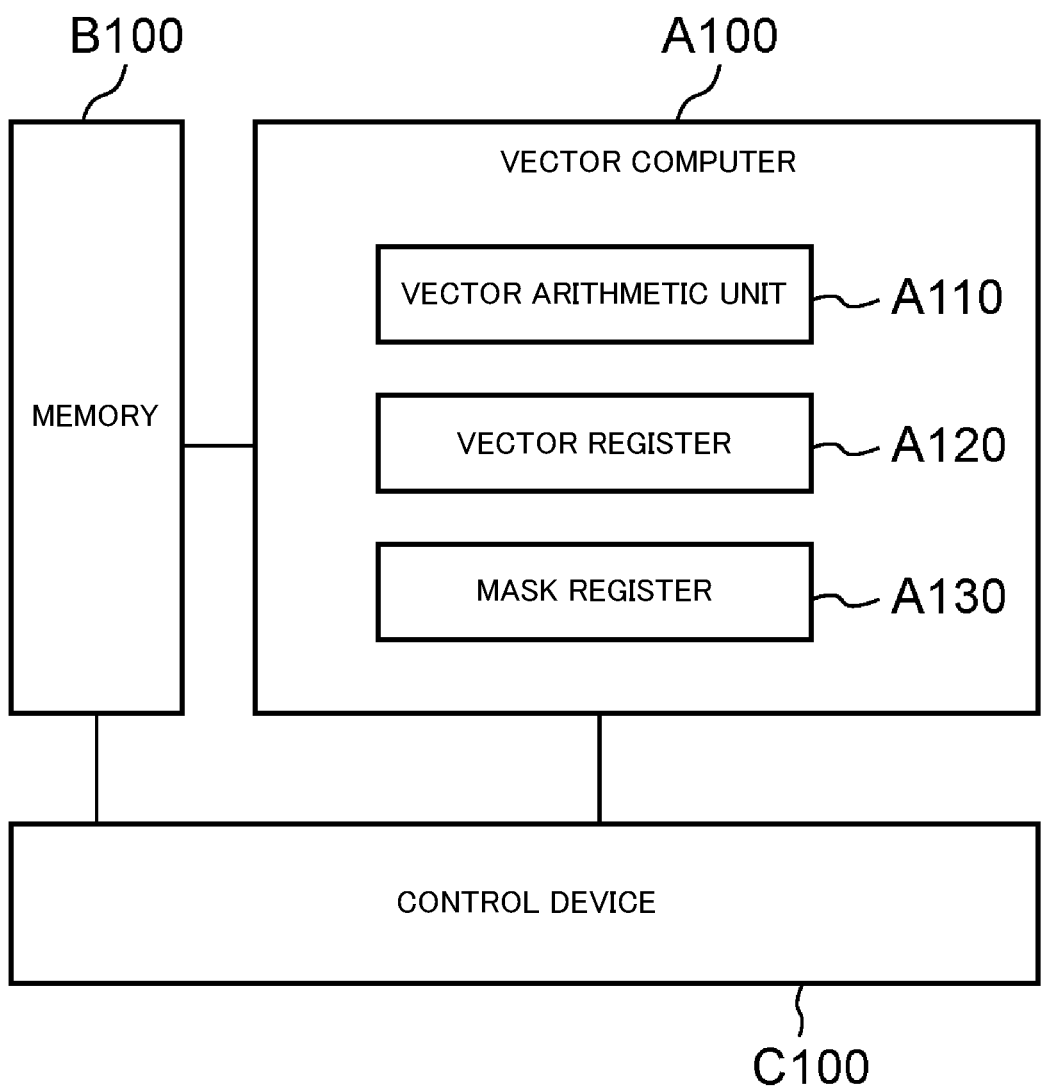
FIG. 1 is a block diagram illustrating a schematic configuration of a computer system including a vector computer.

Referring to FIG. 1, a vector computer A100 will be described. The vector computer A100 includes a register (vector register) A120 capable of storing a plurality of numeric values. The number of elements in the vector register A120 is referred to as a vector length. The vector computer A100 includes a vector arithmetic unit A110 executing similar computations on a plurality of numeric values in the vector register A120 in parallel. For example, the vector arithmetic unit A110 includes N (unillustrated) arithmetic units (where N is an integer equal to or more than 2). For example, N may be 256.

The vector computer A100 further includes a mask register A130 controlling computation units (arithmetic units) in the vector arithmetic unit A110. The vector computer A100 is capable of performing an operation such as executing a computation at a computation unit (arithmetic unit) with a related bit of the mask register A130 being 1 and not executing a computation at a computation unit (arithmetic unit) with a related bit being 0.

The vector computer A100 is connected to a memory (main storage device) B100. The vector computer A100 and the memory B100 are controlled by a control device C100.

While the example embodiments of the present invention to be described later target a vector computer, the present invention is also effective in a computer architecture executing parallelization at an instruction level such as a general-purpose computing on graphics processing units (GPGPU).

GPGPU is a technology of applying a computing resource of a graphics processing unit (GPU) being a computation device dedicated to image processing to a purpose other than image processing. While a GPU is originally an accelerator dedicated to graphics computation, GPGPU uses high computation performance of a GPU not only in a graphics computation but also in a more generally used calculation with a high degree of freedom. A vector computer and GPGPU are hereinafter generically called "parallel computers."

As is known in this technical field, a GPU is equipped with a plurality of cores and enhances computation performance by being equipped with many cores capable of executing simple instructions while a single core is not capable of executing a plurality of instructions. A GPU has a single instruction multiple thread (SIMT) architecture capable of simultaneously executing a plurality of threads executing the same instruction in each core. Accordingly, a GPU is suitable for a computation repeatedly executing the same instruction and a calculation in which an amount of computation is large relative to an amount of memory access, such as an N-body problem and a matrix product. The calculations can exploit high computation performance on a GPU.

Next, union processing on sorted sets being processing handled by the example embodiments of the present invention will be described. A "set" refers to a collection of elements and does not include duplicate elements. In other words, elements of a set are characterized by not being equal to one another. It is assumed in the example embodiments of the present invention that an order (greater, smaller, or equal) relation can be established among elements of a set. For example, an order relation can be established among integers and/or decimals. A "sorted set" refers to a set in which an order of elements of the set is determined, and a relation that a preceding element is equal to or greater than (symbolized as < and referred to as an ascending order) or equal to or less than (symbolized as > and referred to as a descending order) a succeeding element holds. An element is specified by an index, a pointer, or the like in a sorted set. An ascending order and a descending order do not make an essential difference. Then, it is assumed in the following description that a sorted set is a set in which elements are arranged in ascending order.

Next, the union processing on sorted sets will be described. As described above, the processing is processing of outputting, as an output set, a sorted set including output elements including every input element included in (two or more) sorted sets being input sets and not including other elements in a state of eliminating duplicate input elements. Next, a specific example will be described.

The following three sorted sets A1, A2, and A3 will be considered as input sets below. A1, A2, and A3 are respectively referred to as first to third input sets. Note that the input sets are all sorted.

A1: [1, 4, 6, 8], A2: [4, 6, 7, 9], A3: [2, 4, 8]

An output set B being a result of the union processing on the input sets is as follows.

B: [1, 2, 4, 6, 7, 8, 9]

In order to acquire the output set B of the union processing, the union processing may be performed individually on the first to third input sets A1, A2, and A3. Specifically, the final output set B can be acquired by performing the union processing on the first input set A1 and the second input set A2 and performing the union processing on the output sorted set and the third input set A3. The union processing may be performed on the first to third input set A1, A2, and A3 in any order.

When the merge processing is performed on the aforementioned input sets A1, A2, and A3, the resulting output set C becomes as follows.

C: [1, 2, 4, 4, 4, 6, 6, 7, 8, 8, 9]

Specifically, duplicate elements are not deleted in the merge processing, and therefore the total number of input elements in input sets and the number of output elements in an output set are equal. On the other hand, duplicate elements are deleted in the union processing, and therefore the number of output elements in an output set is less than the total number of input elements in input sets. Accordingly, by repeating the union processing, the number of output elements in an acquired output set gradually decreases. This is the difference between the union processing and the merge processing.

Next, the example embodiments of the present invention will be described in detail with reference to drawings.

First Example Embodiment

A parallel union control device according to a first example embodiment of the present invention will be described below. The parallel union control device is used as the control device C100 in FIG. 1.

With respect to pairs of sorted sets (input sets) the number of which being the number of elements (vector length) of the vector register A120, the parallel union control device causes the union processing (to be described later) to be executed in parallel on each pair of input sets by use of the vector arithmetic unit A110. The vector length is equal to N being the number of arithmetic units in the vector arithmetic unit A110. For example, the vector length N may be 256.

Figure 2:
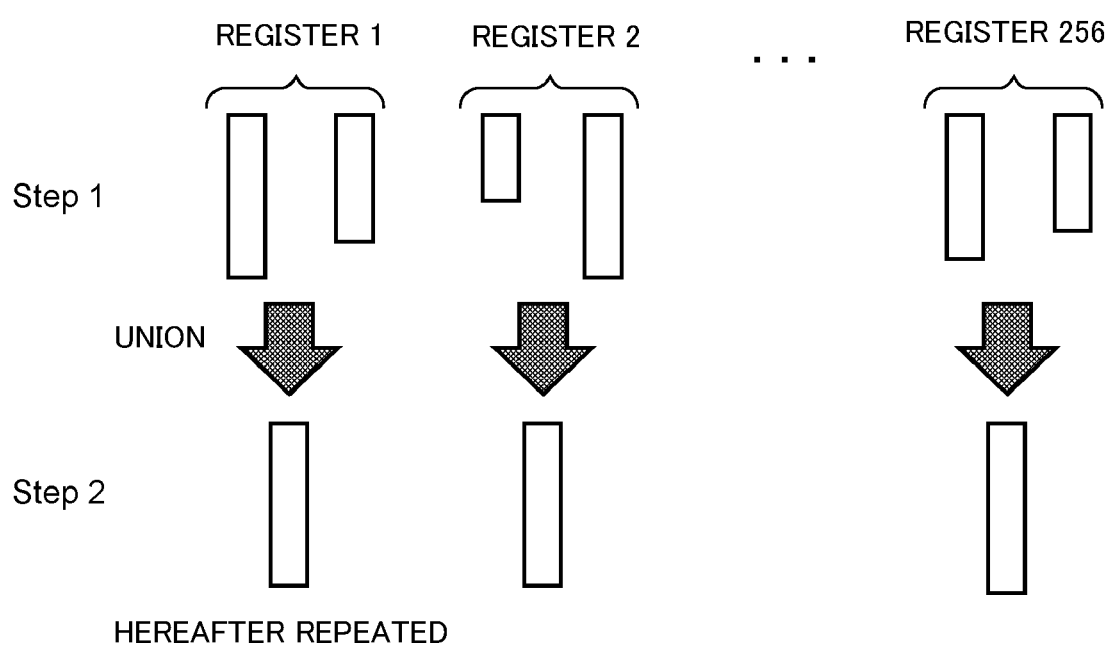
FIG. 2 is a diagram illustrating an example of generating 256 pairs from 512 sorted sets (input sets) and causing the vector computer illustrated in FIG. 1 to execute union processing 256 times in parallel.

In this case, as illustrated in FIG. 2, the parallel union control device generates 256 pairs from 512 sorted sets (input sets) and causes the vector computer A100 to execute the union processing 256 times in parallel. The elements (256 pieces) of the vector register A120 manage data in the sorted sets (input sets), respectively.

Next, the union processing executed on a pair of sorted sets (input sets) in the vector computer A100 by use of the parallel union control device will be described.

It is first assumed that the parallel union control device defines pointers pointing to input elements of both input sets, and the pointers initially point to top input elements of the input sets. Next, the parallel union control device causes each arithmetic unit in the vector arithmetic unit A110 to compare the two input elements of the input sets pointed to by both pointers. When the two input elements turn out to be not equal as a result of the comparison, the parallel union control device causes each arithmetic unit to select the smaller input element as an output element, adds the selected output element at the end of an output sorted set (output set), and increments a pointer pointing to the smaller input element. When the two input elements turn out to be equal as a result of the comparison, the parallel union control device adds the input element at the end of the output set as a selected output element and increments the pointers pointing to both input elements. The parallel union control device causes each arithmetic unit to continue the comparison processing until both pointers point to input elements at the end of the input sets.

Description of Configuration

Figure 3:
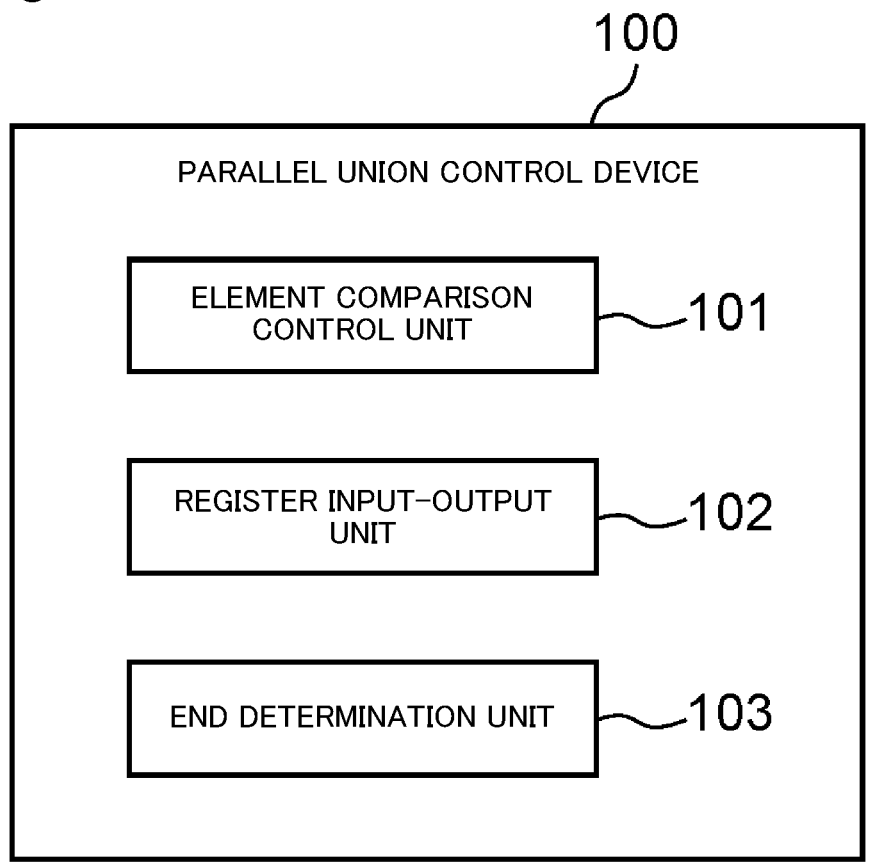
FIG. 3 is a block diagram illustrating a configuration of a parallel union control device according to a first example embodiment of the present invention.

FIG. 3 is a block diagram illustrating a configuration of a parallel union control device 100 according to the first example embodiment of the present invention. The parallel union control device 100 includes an element comparison control unit 101, a register input-output unit 102, and an end determination unit 103.

The element comparison control unit 101 causes each arithmetic unit in the vector arithmetic unit A110 to compare two input elements of a pair of sorted sets (input sets) being targets of the union processing (that is, a pair of sorted sets to undergo the union processing). As a result of the comparison, the element comparison control unit 101 causes the arithmetic unit to select the smaller input element as an output element and add the selected output element at the end of an output sorted set (output set). The element comparison control unit 101 further increments a pointer pointing to the smaller input element and causes the pointer to point to the next input element in order in the input set. When two input elements turn out to be equal as a result of comparison, the element comparison control unit 101 causes the arithmetic unit to select the input element as an output element and add the selected output element at the end of the output set, and increments both pointers.

Figure 4:
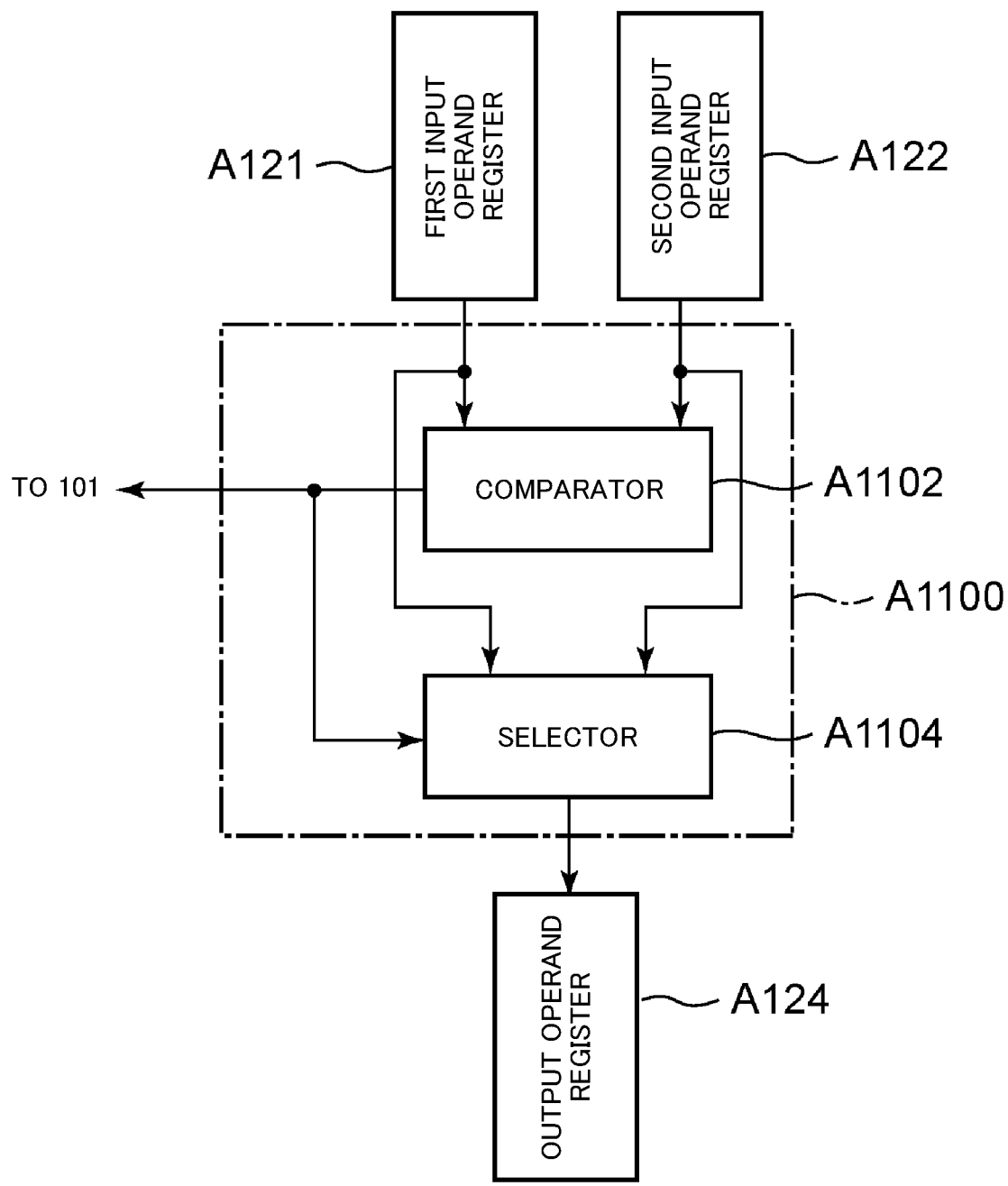
FIG. 4 is a diagram illustrating a connection relation between an arithmetic unit in a vector arithmetic unit controlled by an element comparison control unit used in the parallel union control device illustrated in FIG. 3 and a vector register storing an input set and an output set input and output to and from the arithmetic unit.

FIG. 4 is a diagram illustrating a connection relation between an arithmetic unit A1100 in the vector arithmetic unit A110 controlled by the element comparison control unit 101 and the vector register A120 storing input sets and an output set input and output from and to the arithmetic unit A1100.

The arithmetic unit A1100 includes a comparator A1102 and a selector A1104. First and second input operand registers A121 and A122 in the vector register A120 are connected to a pair of input terminals on the comparator A1102. An output operand register A124 in the vector register A120 is connected to an output terminal on the selector A1104. A comparison result by the comparator A1102 is supplied to the element comparison control unit 101.

The first input operand register A121 stores input elements of a first input set being one of the input sets. The second input operand register A122 stores input elements of a second input set being the other of the input sets. The output operand register A124 stores output elements of the output set. The output operand register A124 includes a first-in first-out (FIFO) buffer.

Figure 5:
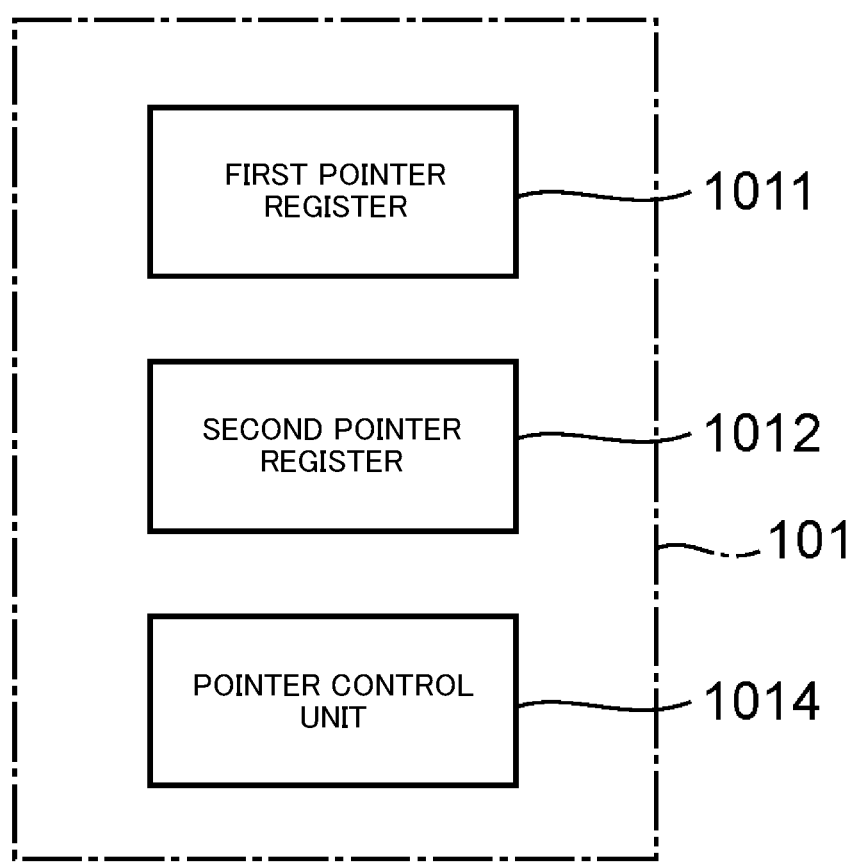
FIG. 5 is a diagram illustrating an example of a configuration of the element comparison control unit used in the parallel union control device illustrated in FIG. 3.

FIG. 5 is a diagram illustrating an example of a configuration of the element comparison control unit 101. The element comparison control unit 101 includes a first pointer register 1011, a second pointer register 1012, and a pointer control unit 1014.

The first pointer register 1011 stores a first pointer pointing to an input element of the first input set stored in the first input operand register A121. The second pointer register 1012 stores a second pointer pointing to an input element in the second input set stored in the second input operand register A122. The pointer control unit 1014 controls the first and second pointer registers 1011 and 1012 in response to the aforementioned comparison result.

In other words, the element comparison control unit 101 controls the arithmetic unit A1100 in such a way that the arithmetic unit A1100 operates as a combination of the comparator A1102 and the selector A1104.

Returning to FIG. 3, the register input-output unit 102 loads the first and second input sets including two input elements to be compared by the arithmetic unit A1100 under the control of the element comparison control unit 101 into the first and second input operand registers A121 and A122 in the vector register A120, respectively, from the memory B100 connected to the vector computer A100 (FIG. 1). After the comparison processing in the arithmetic unit A1100 under the control of the element comparison control unit 101 is ended, the register input-output unit 102 stores an output element stored in the output operand register A124 in the vector register A120 into the memory B100 connected to the vector computer A100.

The end determination unit 103 determines whether to end the union processing executed in parallel for the number of times corresponding to the vector length. The end determination unit 103 manages an end flag indicating whether the union processing on a pair of sorted sets (input sets) is ended. Specifically, the end flag is held on the mask register A130 in the vector computer A100. When both pointers pointing to input elements of paired sorted sets (input sets) are determined to point to the end of the respective input sets, the end determination unit 103 sets a related end flag to 1.

When an end flag is 1, the union processing on a related pair of sorted sets (input sets) is determined to be ended, and therefore the parallel union control device 100 does not cause the vector computer A100 to execute the union processing. When the end determination unit 103 determines that an end flag for every pair of sorted sets (input sets) is 1, the parallel union control device 100 ends the entire processing.

Description of Operation

Figure 6:
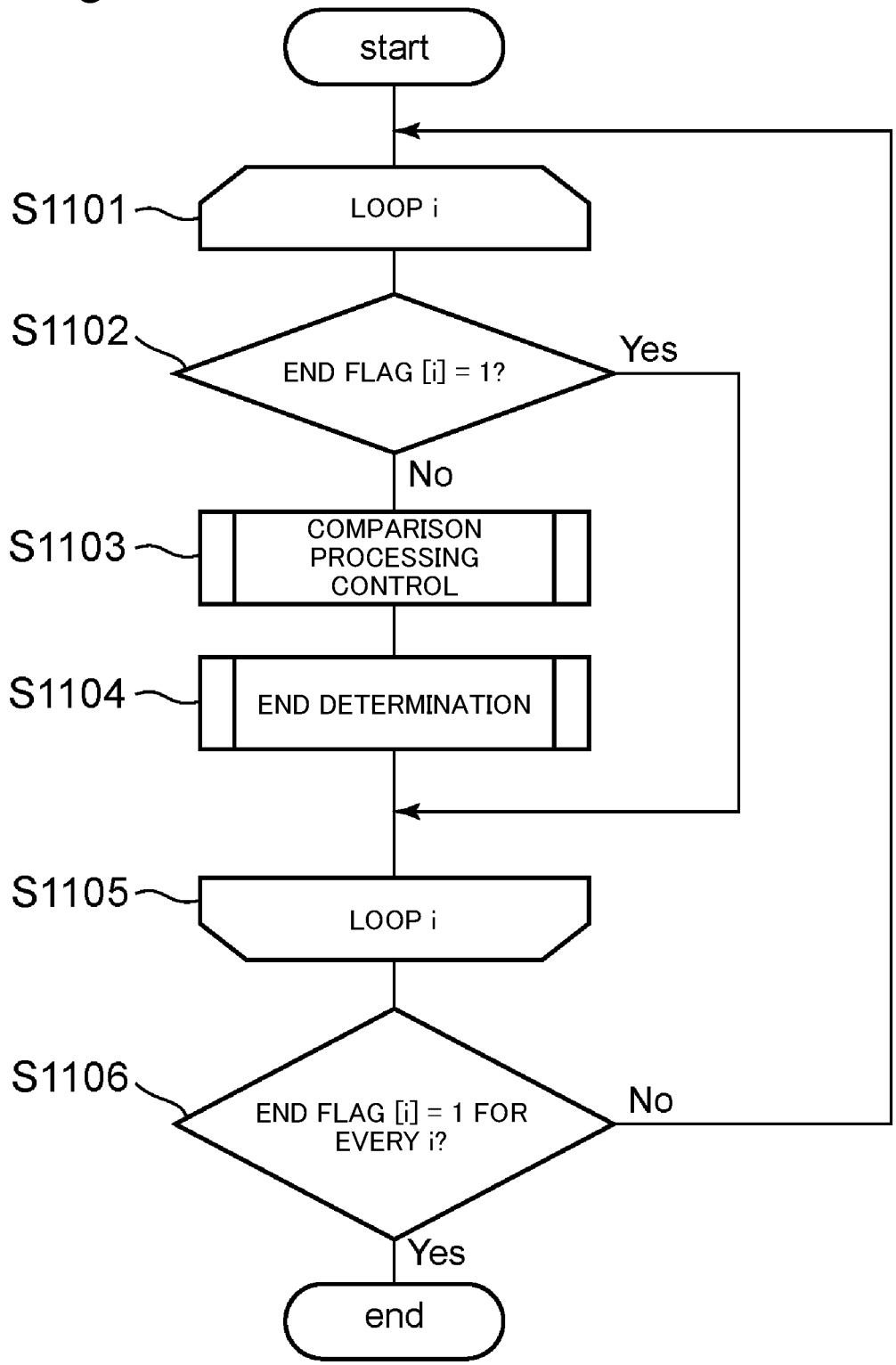
FIG. 6 is a flowchart for illustrating an operation of entire processing by the parallel union control device illustrated in FIG. 3.

FIG. 6 is a flowchart for illustrating an operation of the entire processing by the parallel union control device 100.

At the starting stage of the processing, N end flags the number of which being the vector length are secured, and a value of every end flag is 0. The end flags the number of which being the vector length being inputs are held by the mask register A130. One of paired input sets undergoing the union processing is herein referred to as a "left set," and the other is referred to as a "right set." A pointer pointing to an input element of the left set is referred to as a "left pointer," and a pointer pointing to an input element of the right set is referred to as a "right pointer."

As is obvious from the above, the left set is also referred to as a first input set, and the right set is also referred to as a second input set. The left pointer is also referred to as a first pointer, and the right pointer is also referred to as a second pointer.

Initially, the left pointer and the right pointer are set to point to the first input elements of the left set and the right set, respectively. Registers storing left pointers and right pointers the number of each being the vector length are referred to as a "left pointer register" and a "right pointer register," respectively. Vector registers storing input elements of the left set and the right set are referred to as a "left element register" and a "right element register," respectively.

As is obvious from the above, the left pointer register is also referred to as the first pointer register 1011, and the right pointer register is also referred to as the second pointer register 1012. The left element register is also referred to as the first input operand register A121, and the right element register is also referred to as the second input operand register A122.

Step S1101 indicates the beginning of a loop (loop number i relating to each pair of a left set and a right set) related to sorted sets (input sets) the number of which being the vector length. Processing in the loop may be executed in parallel by use of the vector arithmetic unit A110 (FIG. 1).

In Step S1102, the end determination unit 103 determines whether an end flag related to the i-th pair is 1. When the result in Step S1102 is No, the parallel union control device 100 advances to comparison processing control in next Step S1103. When the result in Step S1102 is Yes, the parallel union control device 100 does not execute processing in Steps S1103 and S1104. The above may be executed in parallel by placing the end flag in the mask register A130 and making a determination in the vector arithmetic unit A110.

In Step S1103, the element comparison control unit 101 controls the arithmetic unit A1100 in the vector arithmetic unit A110 to perform the comparison processing.

Figure 7:
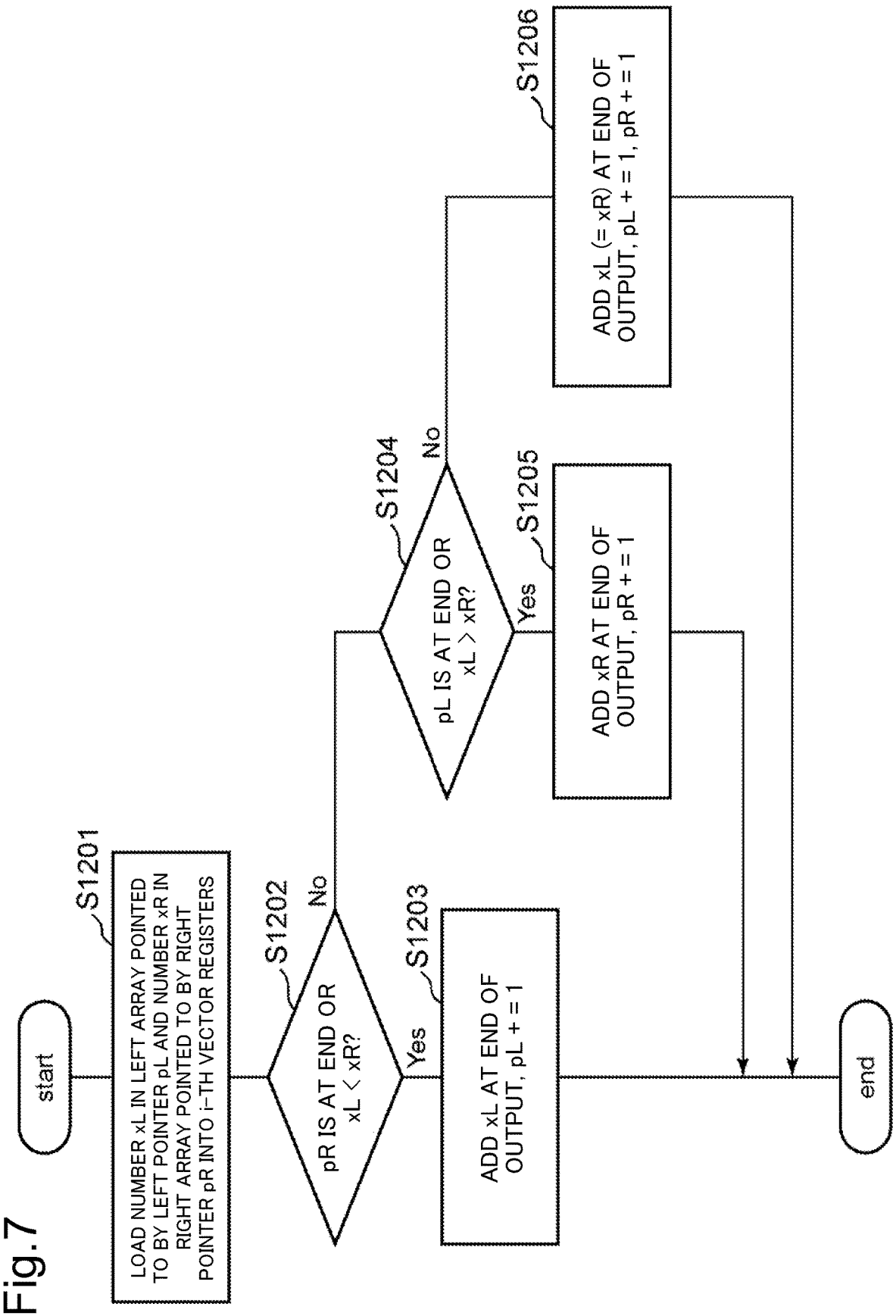
FIG. 7 is a flowchart illustrating details of comparison processing control in the element comparison control unit used in the parallel union control device illustrated in FIG. 3.

FIG. 7 is a flowchart illustrating details of the comparison processing control in the element comparison control unit 101.

First, the register input-output unit 102 stores, from the memory B100, a left set and a right set respectively including input elements xL and xR pointed to by a left pointer pL and a right pointer pR into the i-th left element register A121 and the i-th right element register A122 (see FIG. 2), respectively (Step S1201).

Next, in Step S1202, the element comparison control unit 101 makes a determination about a condition "pR points to the end of the right set or xL<xR." When the result in Step S1202 is Yes, the element comparison control unit 101 causes the arithmetic unit A1100 to select the input element xL pointed to by the left pointer 1011 as an output element. The element comparison control unit 101 further causes arithmetic unit A1100 to add the input element xL selected as the output element at the end of the output operand register A124 storing an output sorted set (output set). Then, the element comparison control unit 101 increments the left pointer pL in the left pointer register 1011 (Step S1203).

When the result in Step S1202 is No, the element comparison control unit 101 makes a determination about a condition "pL points to the end of the left set or xR<xL" (Step S1204). When the result in Step S1204 is Yes, the element comparison control unit 101 causes the arithmetic unit A1100 to select the input element xR pointed to by the right pointer as an output element. The element comparison control unit 101 further causes the arithmetic unit A1100 to add the input element xR selected as the output element at the end of the output operand register A124 storing the output set. Then, the element comparison control unit 101 increments the right pointer pR in the right pointer register 1012 (Step S1205).

The result in Step S1204 being No indicates xL=xR. In that case, the element comparison control unit 101 causes the arithmetic unit A1100 to select the input element as an output element. The element comparison control unit 101 further causes the arithmetic unit A1100 to add the input element selected as the output element at the end of the output operand register A124 storing the output set. Then, the element comparison control unit 101 increments the left pointer pL in the left pointer register 1011 and the right pointer pR in the right pointer register 1012 (Step S1206). The above concludes the comparison processing control S1103.

Returning to FIG. 6, next, the end determination unit 103 makes an end determination in Step S1104.

Figure 8:
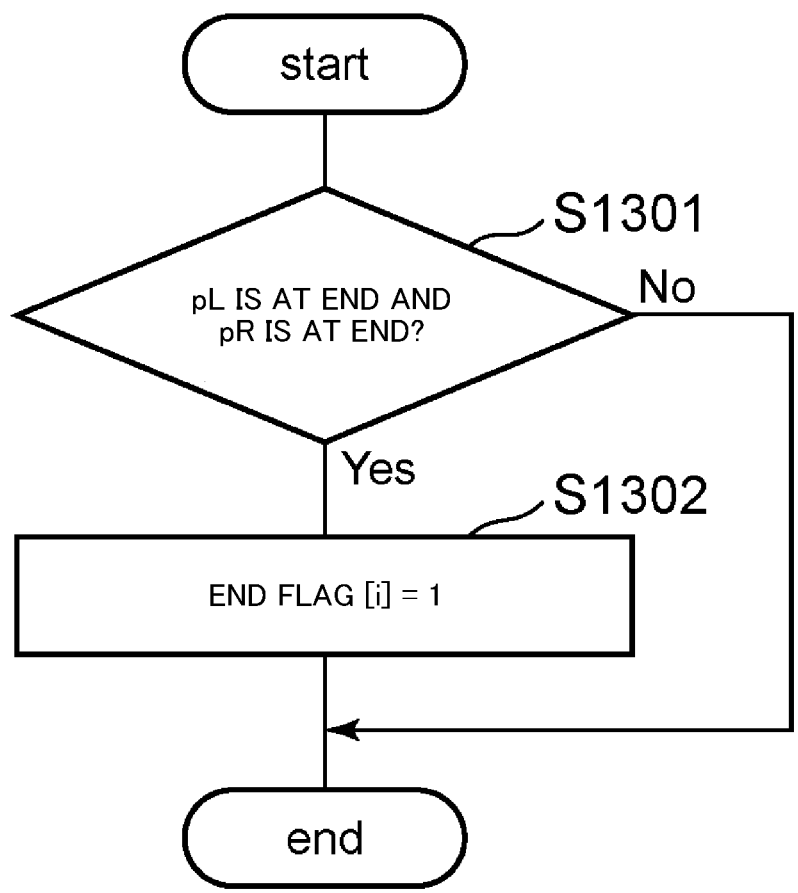
FIG. 8 is a flowchart illustrating details of end determination in an end determination unit used in the parallel union control device illustrated in FIG. 3.

FIG. 8 is a flowchart illustrating details of the end determination in the end determination unit 103.

First, the end determination unit 103 makes a determination about a condition "pL points to the end of the left set AND pR points to the end of the right set" (Step S1301). When the result in Step S1301 is Yes, the end determination unit 103 substitutes 1 for the i-th end flag and ends the processing. On the other hand, when the result in Step S1301 is No, the end determination unit 103 ends the processing without any action. The above concludes the end determination in Step S1104.

Returning to FIG. 6, the loop processing ends in Step S1105.

Next, in Step S1106, the end determination unit 103 determines whether every end flag is 1. When the result in Step S1106 is Yes, the parallel union control device 100 ends the entire processing. When the result in Step S1106 is No, the parallel union control device 100 returns to the loop processing in Step S1101.

The operation of the entire processing in the parallel union control device 100 has been described above by use of FIG. 3. While it is assumed in the above description that the number of pairs of sorted sets (input sets) being inputs to the union processing is the vector length N of the vector computer A100, the number of pairs according to the example embodiments of the present invention may be the same or less. In this case, an end flag not involved in the processing may be set to 1 from the beginning.

Further, according to the first example embodiment, when the parallel union processing is performed once, the number 2N of input sorted sets (input sets) is halved to N as the number of the output sets (see Step 1 in FIG. 2). By repeating the parallel union processing, an output set including a single sorted set can be finally acquired as an output (see Step 2 and "REPEATED" in FIG. 2). Details will be described in the next example embodiment.

Description of Effects

Next, an effect of the first example embodiment will be described.

The first example embodiment enables high-speed execution of the union processing on sorted sets (input sets) by use of the vector arithmetic unit (core) A110 in the vector computer (parallel computer) A100.

Second Example Embodiment

Next, a multi-union-control device according to a second example embodiment of the present invention will be described.

Description of Configuration

Figure 9:
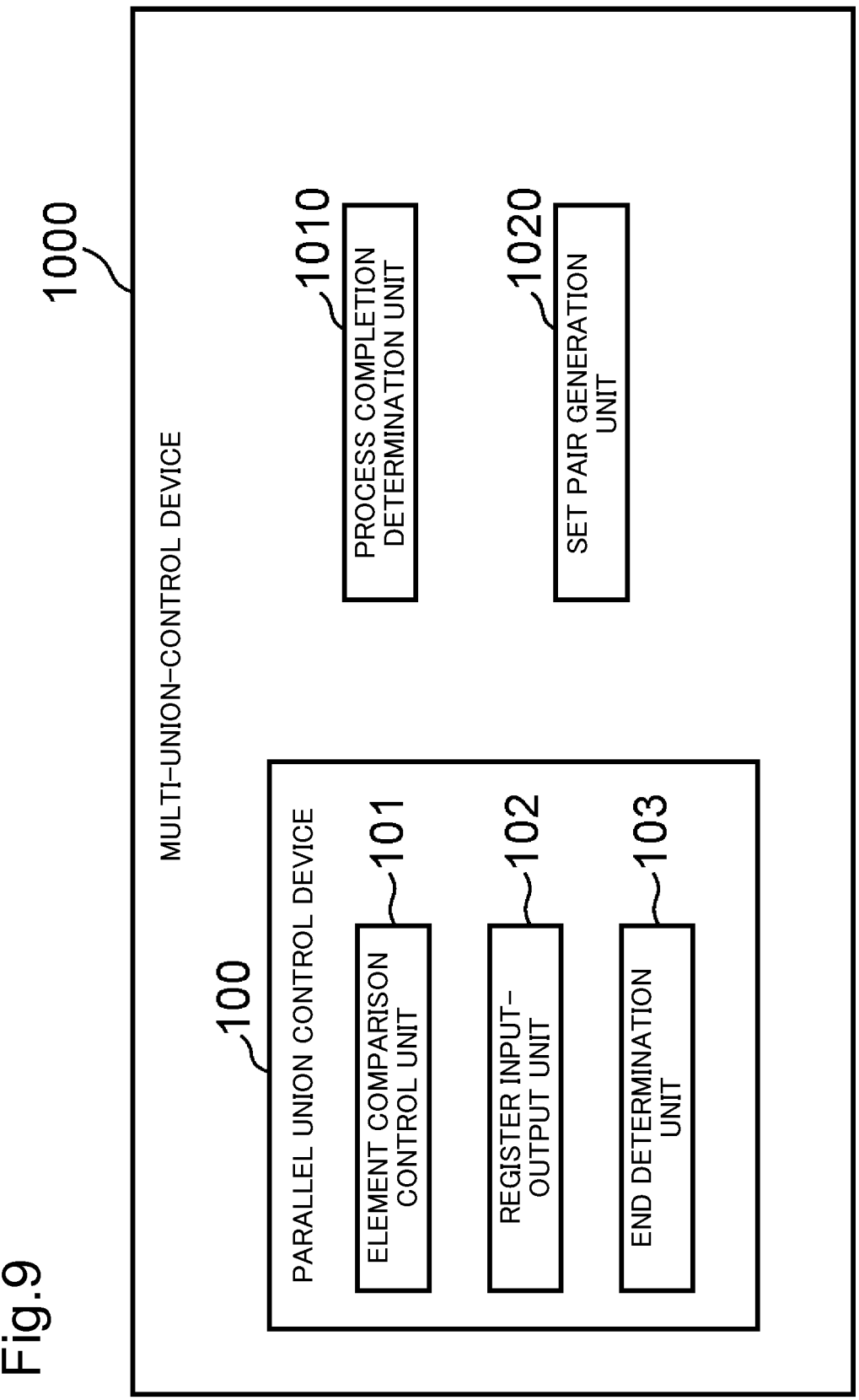
FIG. 9 is a block diagram illustrating a configuration of a multi-union-control device according to a second example embodiment of the present invention.

FIG. 9 is a block diagram illustrating a configuration of a multi-union-control device 1000 according to the second example embodiment of the present invention.

The multi-union-control device 1000 includes the aforementioned parallel union control device 100. In addition to the parallel union control device 100, the multi-union-control device 1000 further includes a process completion determination unit 1010 and a set pair generation unit 1020.

Next, a function of the multi-union-control device 1000 will be briefly described.

The multi-union-control device 1000 repeatedly uses the parallel union control device 100, takes a plurality of sorted sets as input sets, and, as a result of the union processing, outputs only one sorted set as an output set.

During the repeated control of the parallel union processing in the parallel union control device 100, the process completion determination unit 1010 determines whether the number of remaining sorted sets (input sets) is 1 and determines ending processing in the multi-union-control device 1000.

The set pair generation unit 1020 generates (a plurality of) pairs of sorted sets (input sets) being inputs to the first and second input operand registers A121 and A122 in the vector register A120 from a plurality of sorted sets under the control of the parallel union control device 100.

Description of Operation

Figure 10:
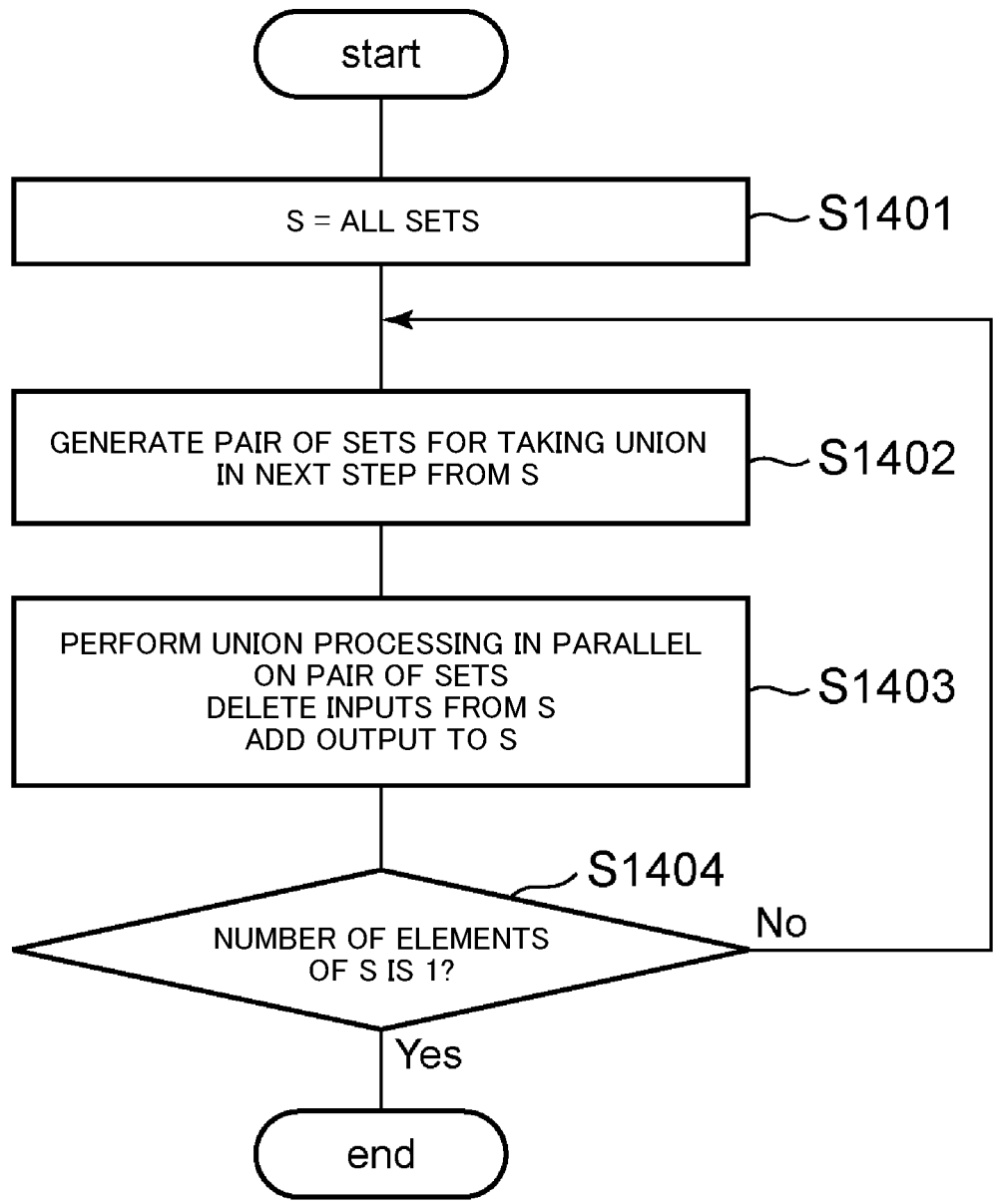
FIG. 10 is a flowchart for illustrating an operation of entire processing by the multi-union-control device illustrated in FIG. 9.

FIG. 10 is a flowchart for illustrating an operation of entire processing by the multi-union-control device 1000.

First, all sorted sets being targets of the multi-union-control device 1000 are denoted as S (Step S1401). It is assumed that the number of all the sorted sets S is equal to 2N.

In the next step, the set pair generation unit 1020 generates pairs of sorted sets (input sets) being inputs to the first and second input operand registers A121 and A122 from the all sorted sets S, under the control of the parallel union control device 100 (Step S1402). It is assumed that the number of pairs of input sets is the smaller of a vector length and N being a half of the number 2N of sets to which all the sorted sets S belong.

Several generation methods of set pairs may be considered. First, one generation method is a method of randomly generating pairs of input sets from the all sorted sets S. Another generation method is a method of selecting sorted sets (input sets) the number of which being the number of pairs to be generated from the all sorted sets S in ascending order of the number of input elements in an input set and randomly generating pairs of input sets.

Subsequently, the union processing is performed on the generated pairs of input sets by the parallel union control device 100 (Step S1403). The operation is as described in the aforementioned first example embodiment. After the union processing, the multi-union-control device 1000 deletes the input sets from the all sorted sets S and adds the output sorted set (output set) to the all sorted sets S.

Next, the process completion determination unit 1010 determines whether the number of sets included in the all sorted sets S is 1 (Step S1404). When the result in Step S1404 is Yes, the multi-union-control device 1000 ends the operation. When the result in Step S1404 is No, the multi-union-control device 1000 returns to Step S1402 and executes the processing.

Description of Effects

Next, an effect of the second example embodiment will be described.

The second example embodiment enables high-speed execution of the union processing on sorted sets (input sets) by use of the vector arithmetic unit (core) A110 in the vector computer (parallel computer) A100.

Third Example Embodiment

Next, a parallel union control device according to a third example embodiment of the present invention will be described.

The parallel union control device causes one pair of sorted sets (input sets) to undergo union processing in parallel by use of the vector computer A100 and causes one sorted set to be output as an output set. Specifically, the parallel union control device divides a sorted set (input set) belonging to the pair into parts the number of which being a vector length, and a computation unit (arithmetic unit A1100) in the vector arithmetic unit A110 performs the union processing on each subset. Finally, the parallel union control device combines sorted sets independently undergoing the union processing and outputs the resulting set as an output set.

Description of Configuration

Figure 11:
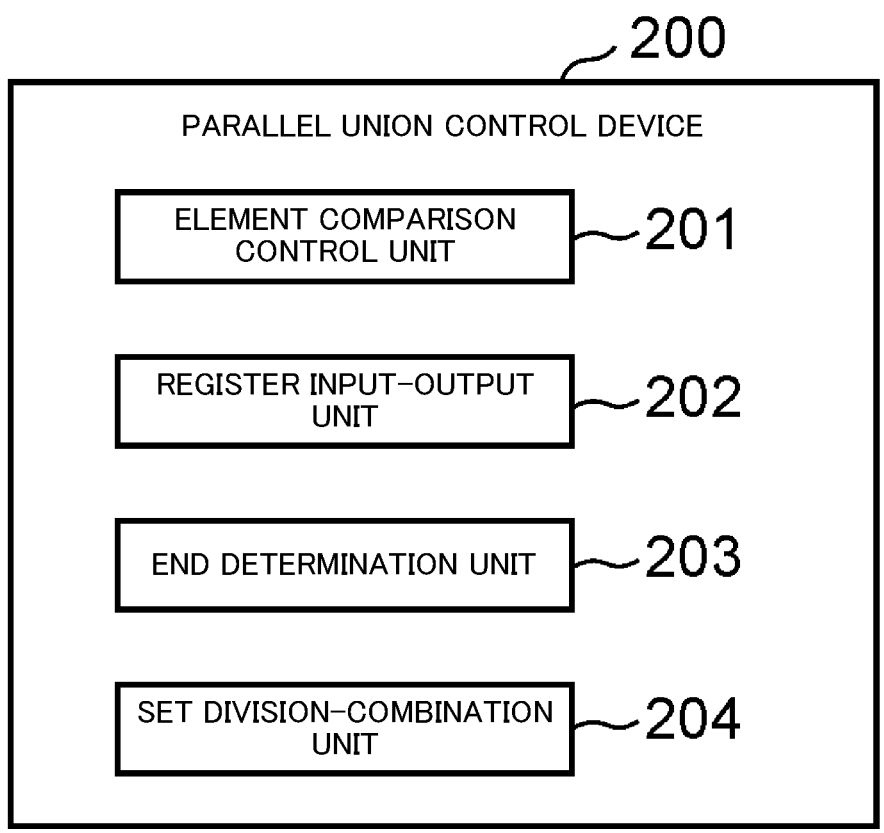
FIG. 11 is a block diagram illustrating a parallel union control device according to a third example embodiment of the present invention.

FIG. 11 is a block diagram illustrating a parallel union control device 200 according to the third example embodiment of the present invention. The parallel union control device 200 according to the third example embodiment includes an element comparison control unit 201, a register input-output unit 202, an end determination unit 203, and a set division-combination unit 204.

The element comparison control unit 201, the register input-output unit 202, and the end determination unit 203 are respectively the same as the element comparison control unit 101, the register input-output unit 102, and the end determination unit 103 in the parallel union control device 100 according to the aforementioned first example embodiment, and therefore description thereof is omitted.

The set division-combination unit 204 divides a pair of sorted sets (input sets) being inputs into a predetermined number of parts as input subsets. Dividing a pair of sorted sets (input sets) refers to dividing each of a left set and a right set of the pair into a predetermined number of parts. Dividing a sorted set (input set) refers to defining "(the predetermined number)–1" boundaries in the sorted set (input set) before division and dividing the sorted set (input set) on both sides of the boundaries as input subsets.

A specific example will be described below. An example of dividing an input set A: [1, 3, 5, 8, 9, 10, 11] as a sorted set into three input subsets will be described. In this example, it is assumed that a first boundary is taken between 5 and 8, and a second boundary is taken between 9 and 10. At this time, sorted sets after division referred to as first to third input subsets A1, A2, and A3 become as follows, respectively.

A1: [1, 3, 5], A2: [8, 9], A3: [10, 11]

The above is an example and there may be another division.

Denoting a range of values that may be taken by the j-th division of a left set and the i-th division of a right set as Rj, when dividing a pair of sorted sets (input sets), the set division-combination unit 204 satisfies a condition that Rj shall not overlap for every j. The condition is for allowing combination of a plurality of output subsets being results of performing the union processing in parallel after dividing the sorted sets (input sets) to be sufficiently performed simply by concatenating the plurality of output subsets.

Next, a specific example will be viewed. It is assumed that a left set and a right set in a pair (A, B) of sorted sets (input sets) are A: [1, 3, 5, 8, 9, 10, 11] and B: [4, 5, 6, 7, 8, 9, 13], respectively. At this time, sorted sets after division being first to third left subsets respectively denoted as A1, A2, and A3, and first to third right subsets respectively denoted as B1, B2, and B3 become as follows.

A1: [1, 3, 5], A2: [8, 9], A3: [10, 11]
B1: [4, 5, 6, 7], B2: [8, 9], B3: [13]

Ranges that may be taken by input elements of sorted sets Aj and Bj after the division do not overlap ranges for another value of j. The division is an example, and there may be another division. However, it is desirable that the sum of the numbers of input elements in the sorted sets Aj and Bj after the division be equal for every value of j. The reason is that a load of the parallel union processing becomes even.

The set division-combination unit 204 combines a predetermined number of output subsets being a result of performing the union processing after the division. Since the division is performed in such a way that a range of input elements of each sorted set (input set) does not overlap another range, combination of output subsets may be performed by simply concatenating output subsets in ascending order of a range thereof.

Next, a specific example will be viewed. It is assumed that sorted sets (output subsets) after the union processing being first to third output subsets respectively denoted as C1, C2, and C3 are as follows.
C1: [1, 3, 4, 5, 6, 7], C2: [8, 9], and C3: [10, 11, 13]
At this time, an output set C being a sorted set after combination becomes as follows.
C: [1, 3, 4, 5, 6, 7, 8, 9, 10, 11, 13]
The output set C being a sorted set after the combination is acquired as a result of performing the union processing on the left set A before the division and the right set B before the division, the sets being paired.

Description of Operation

Figure 12:
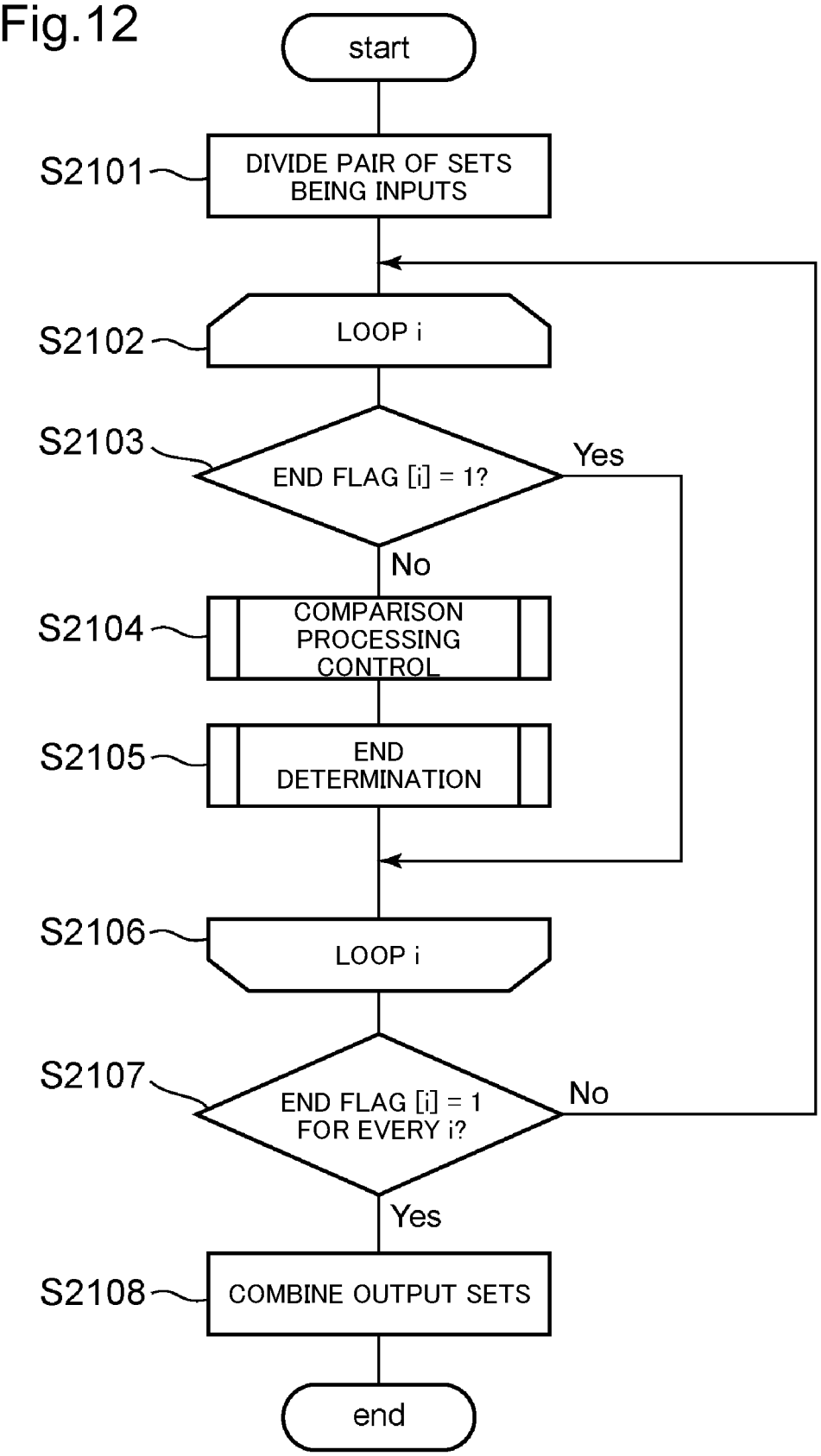
FIG. 12 is a flowchart for illustrating an operation of the parallel union control device illustrated in FIG. 11.

FIG. 12 is a flowchart for illustrating an operation of the parallel union control device 200. The flowchart is the same as the flowchart according to the first example embodiment illustrated in FIG. 6 except for Steps S2101 and S2018, and therefore description of the common part is omitted.

In Step S2101, the set division-combination unit 204 divides a pair of sorted sets (input sets) into a predetermined number of input subsets. The predetermined number is a number not exceeding the vector length.

In Step S2108, the set division-combination unit 204 combines sorted sets (output subsets) undergoing the union processing into one sorted set (output set).

Description of Effects

Next, an effect of the third example embodiment will be described.

The third example embodiment enables high-speed execution of the union processing on sorted sets (input sets) by use of the vector arithmetic unit (core) A110 in the vector computer (parallel computer) A100.

Fourth Example Embodiment

Next, a multi-union-control device according to a fourth example embodiment of the present invention will be described.

The multi-union-control device causes the vector computer A100 to perform union processing on a plurality of sorted sets (input sets) and output one sorted set as an output set, by repeatedly using the aforementioned parallel union control device 200 according to the third example embodiment. The multi-union-control device generates a pair of sorted sets (input sets) for each repetition and causes the vector computer A100 to perform the parallel union processing. The multi-union-control device repeats generation of a pair and the parallel union processing by the vector computer A100 until the number of sorted sets becomes 1.

Description of Configuration

Figure 13:
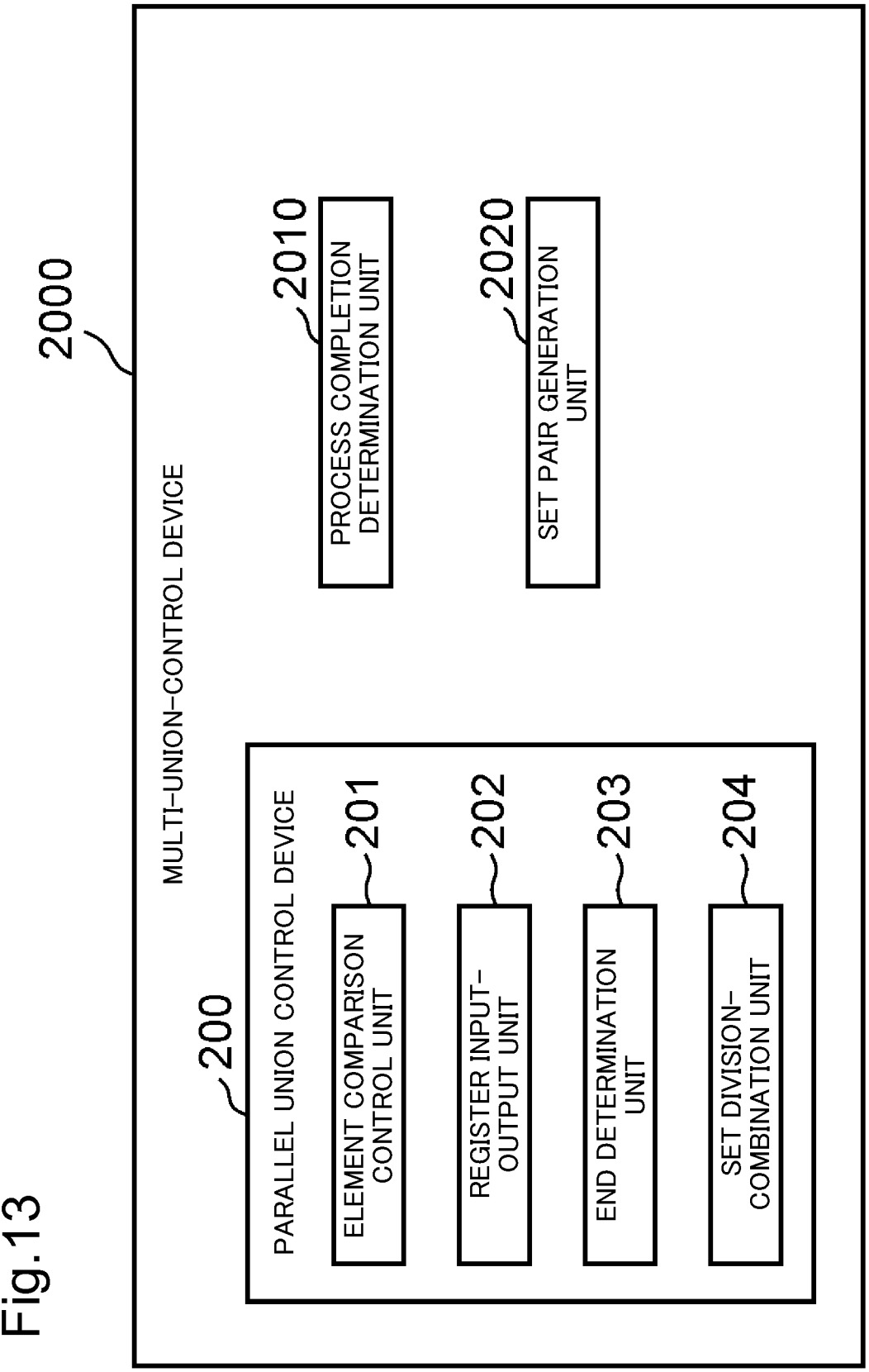
FIG. 13 is a block diagram illustrating a configuration of a multi-union-control device according to the third example embodiment of the present invention.

FIG. 13 is a block diagram illustrating a configuration of a multi-union-control device 2000 according to the fourth example embodiment of the present invention.

The multi-union-control device 2000 includes a parallel union control device 200, a process completion determination unit 2010, and a set pair generation unit 2020.

The parallel union control device 200 is the same as the parallel union control device illustrated in FIG. 11 described in the third example embodiment, and therefore description thereof is omitted.

The process completion determination unit 2010 determines whether the number of sorted sets being targets of the union processing is 1 and when the number is 1, ends the entire processing.

The set pair generation unit 2020 selects two input sets from sorted sets being targets of the union processing and generates a pair.

Figure 14:
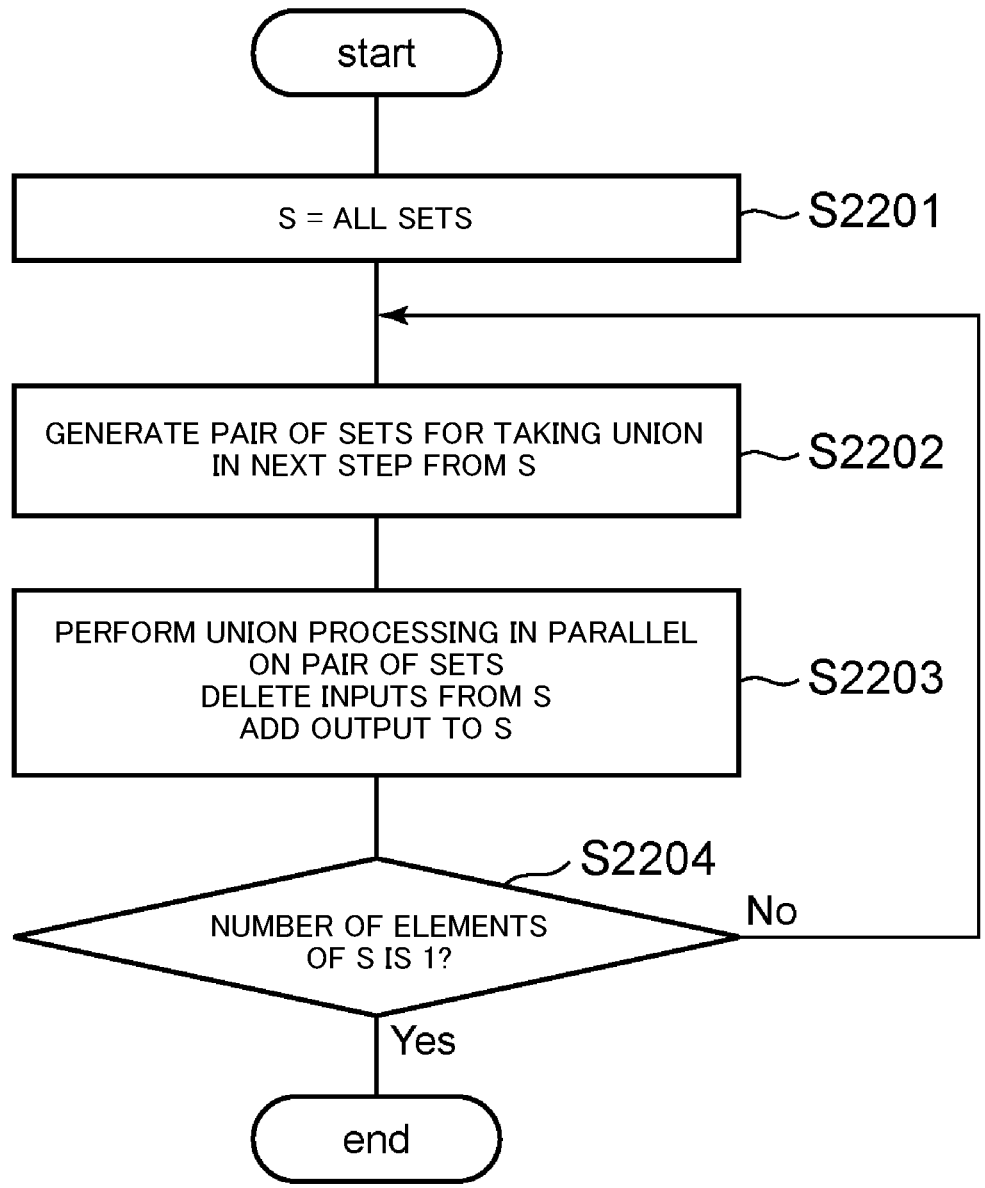
FIG. 14 is a flowchart for illustrating an operation of entire processing by the multi-union-control device illustrated in FIG. 13.

Description of Operation FIG. 14 is a flowchart for illustrating an operation of entire processing by the multi-union-control device 2000.

The flowchart in FIG. 14 is basically the same as that in FIG. 10, and therefore only the difference will be mentioned below.

In Step S2202, the set pair generation unit 2020 generates only one pair of input sets from all sorted sets S. S denotes a set of sorted sets being targets of the union processing.

In Step S2203, the vector computer A100 is caused to perform the union processing on one pair of input sets by use of the parallel union control device 200.

Description of Effects

Next, an effect of the fourth example embodiment will be described.

The fourth example embodiment enables high-speed execution of the union processing on sorted sets (input sets) by use of the vector arithmetic unit (core) A110 in the vector computer (parallel computer) A100.

Fifth Example Embodiment

Next, a multi-union-control device according to a fifth example embodiment of the present invention will be described. The multi-union-control device includes a first parallel union control device 100 and a second parallel union control device 200, and switches from processing by the first parallel union control device 100 to processing by the second parallel union control device 200 during repetition of parallel union processing.

Description of Configuration

Figure 15:
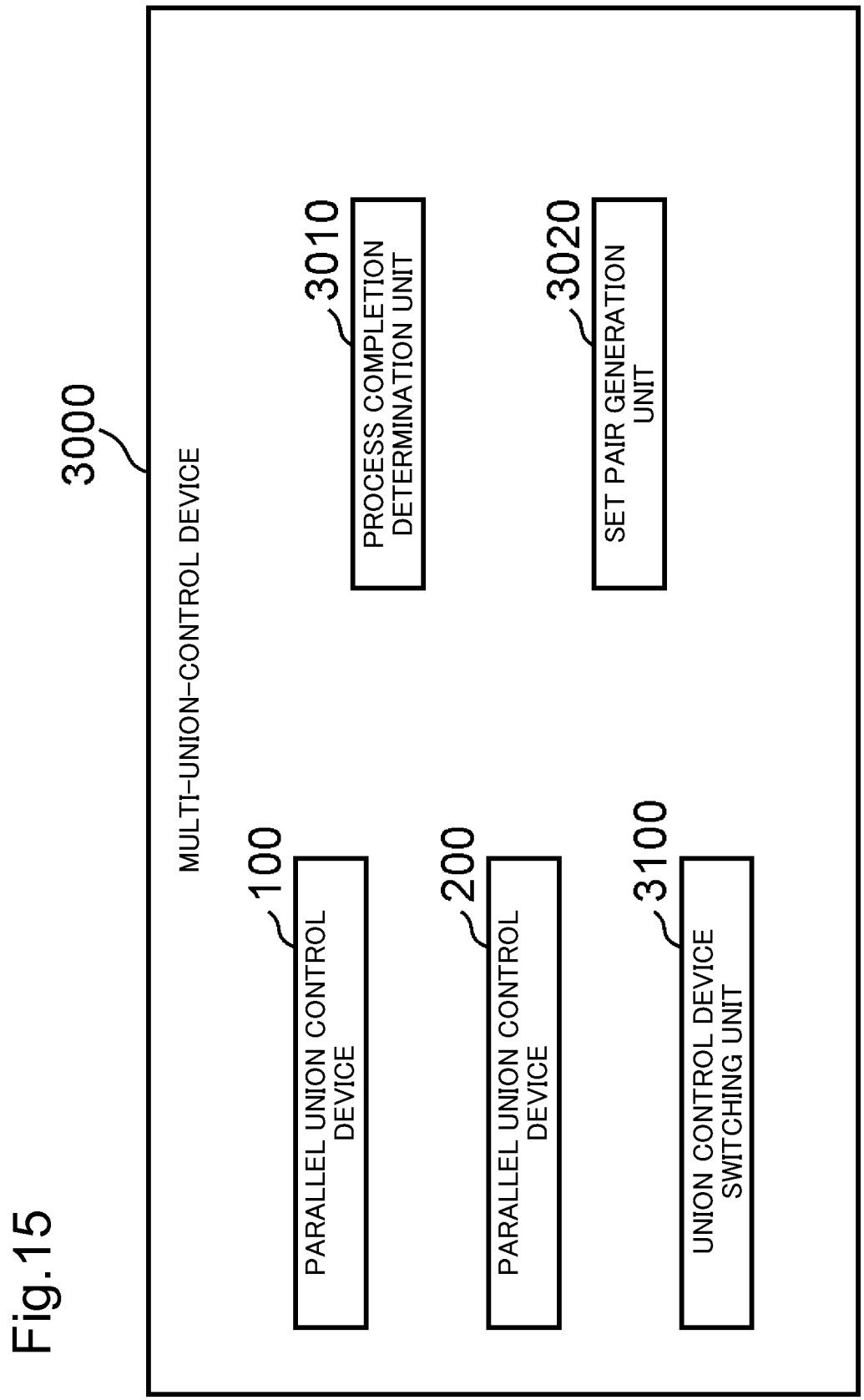
FIG. 15 is a block diagram illustrating a configuration of a multi-union-control device according to a fourth example embodiment of the present invention.

FIG. 15 is a block diagram illustrating a configuration of a multi-union-control device 3000 according to the fifth example embodiment of the present invention.

The multi-union-control device 3000 takes a plurality of sorted sets as input sets and outputs, as an output set, one sorted set acquired by causing the vector computer A100 to perform union processing on the input sets.

As illustrated in FIG. 15, the multi-union-control device 3000 includes the first parallel union control device 100, the second parallel union control device 200, a process completion determination unit 3010, a set pair generation unit 3020, and a union control device switching unit 3100.

Based on a predetermined condition, the union control device switching unit 3100 switches from the union processing by the first parallel union control device 100 to the union processing by the second parallel union control device 200. For example, the predetermined condition is whether the number of target sorted sets exceeds a threshold value. The predetermined condition is not limited to the above.

Figure 16:
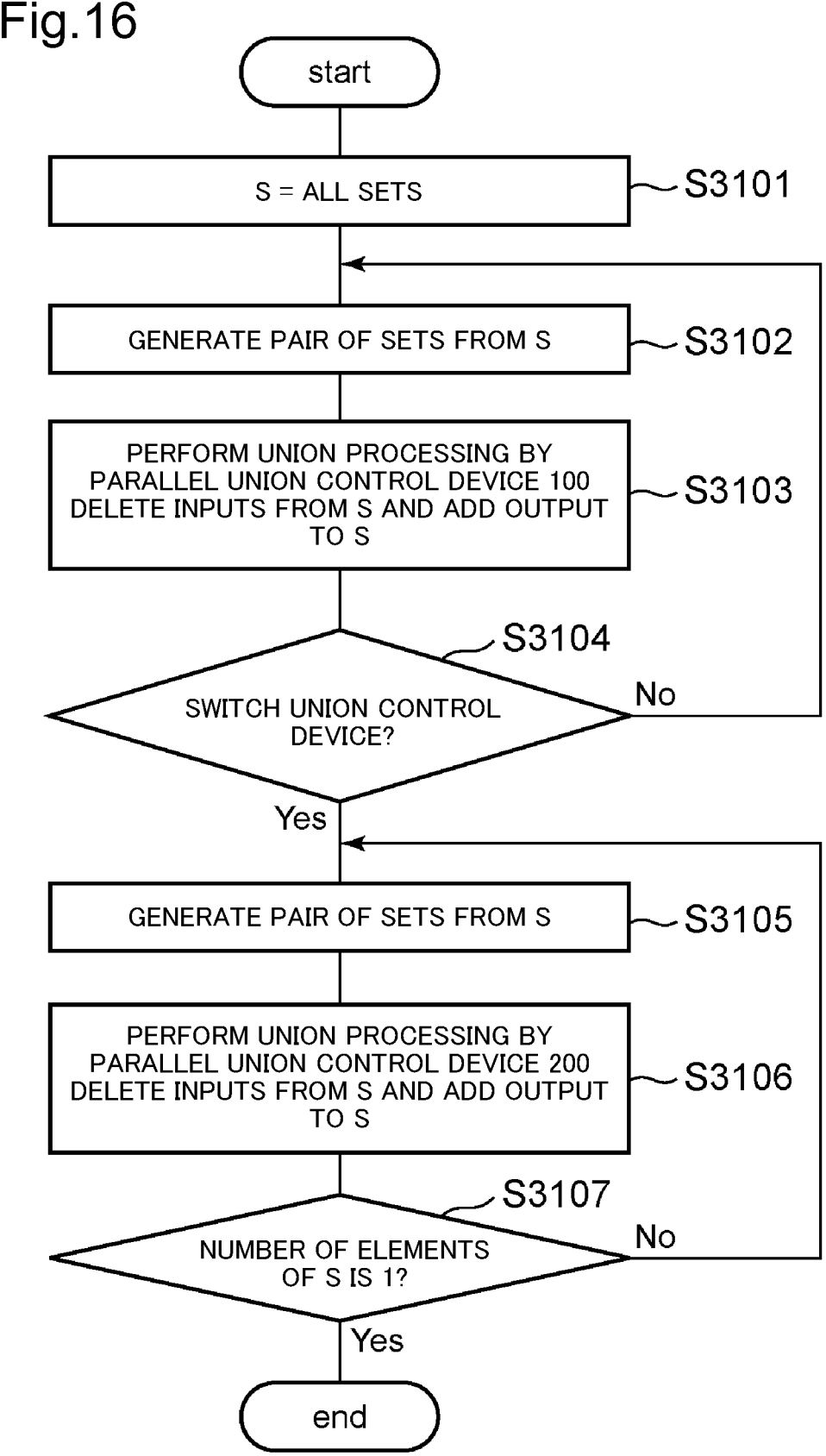
FIG. 16 is a flowchart for illustrating an operation of entire processing by the multi-union-control device illustrated in FIG. 15.

Description of Operation FIG. 16 is a flowchart for illustrating an operation of the multi-union-control device 3000.

In Step S3101, all sorted sets being targets of the union processing are denotes as S.

In Step S3102, the set pair generation unit 3020 generates pairs of sorted sets (input sets) the number of which being a vector length or a predetermined number, from the all sorted sets S.

In Step S3103, the vector computer A100 is caused to perform the union processing in parallel on the previously generated pairs of sorted sets by use of the first parallel union control device 100. The input sets to the union processing are deleted from the all sorted sets S, and the output set is added to the all sorted sets S.

In Step S3104, based on a predetermined condition, the union control device switching unit 3100 determines whether to switch the union control device. The predetermined condition is whether the number of sets included in S is less than a predetermined threshold value, or the like. When the result in Step S3104 is Yes, the processing advances to Step S3105. When the result in Step S3104 is No, the processing returns to Step S3102.

In Step S3105, one pair of sorted sets is generated from the all sorted sets S.

In Step S3106, the vector computer A100 is caused to perform the union processing in parallel on the previously generated pair by use of the second parallel union control device 200. The input sets to the union processing are deleted from the all sorted sets S and the output set is added to the all sorted sets S.

In Step S3107, the process completion determination unit 3010 determines whether the number of sorted sets belonging to the all sorted sets S is 1. When the result in Step S3107 is Yes, the multi-union-control device 3000 ends the entire processing. When the result in Step S3107 is No, the processing returns to Step S3105.

Description of Effects

Next, an effect of the fifth example embodiment will be described.

Initially, the number of sorted sets is large (compared with the vector length). Accordingly, by using the first parallel union control device 100, the vector arithmetic unit A110 can be effectively utilized. When the parallel union processing is repeated, the number of sorted sets becomes smaller, whereas the number of elements in one sorted set becomes larger (compared with the vector length). Accordingly, by using the second parallel union device 200 at this time, the vector arithmetic unit A110 can be effectively utilized. Accordingly, the vector arithmetic unit A110 can be effectively utilized in the entire union processing.

Sixth Example Embodiment

Next, a parallel union control device according to a sixth example embodiment of the present invention will be described.

With respect to a plurality of pairs of sorted sets, the parallel union control device determines a suitable number of divisions for each pair, divides a pair of sets, based on the determined number of divisions, and causes the vector computer A100 to perform union processing in parallel on a plurality of the divided pairs of sets.

While the number of pairs of sorted sets being inputs may not necessarily be a vector length, the vector arithmetic unit A110 can be efficiently utilized when the number of pairs of sets after division (that is, the sum of the numbers of divisions for all pairs of sets) is equal to the vector length.

Description of Configuration

Figure 17:
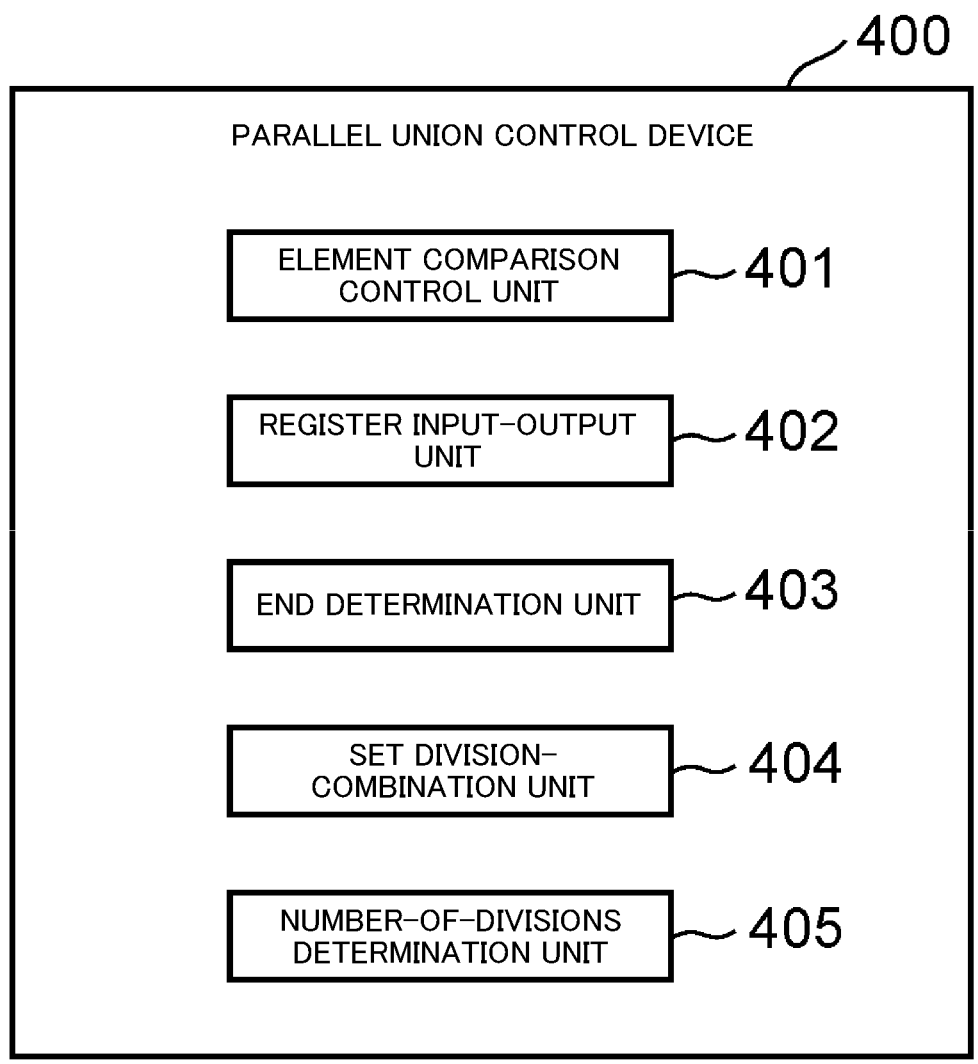
FIG. 17 is a block diagram illustrating a configuration of a parallel union control device according to a fifth example embodiment of the present invention.

FIG. 17 is a block diagram illustrating a configuration of a parallel union control device 400 according to the sixth example embodiment of the present invention.

The parallel union control device 400 includes an element comparison control unit 401, a register input-output unit 402, an end determination unit 403, a set division-combination unit 404, and a number-of-divisions determination unit 405.

Since the set division-combination unit 404 and the number-of-divisions determination unit 405 differ from the configuration according to the first example embodiment illustrated in FIG. 3, the set division-combination unit 404 and the number-of-divisions determination unit 405 will be described below.

The number-of-divisions determination unit 405 determines the number of divisions for each pair of sorted sets being targets of the union processing. Methods of determining the number of divisions include a method of proportionating the number of divisions to the sum of the numbers of elements of both sets belonging to respective pairs and also equalizing the sum of the numbers of divisions with respect to all pairs to the vector length.

Based on the number of divisions determined by the number-of-divisions determination unit 405, the set division-combination unit 404 divides a pair of sorted sets (input sets) into a plurality of input subsets. After performing the union processing, the set division-combination unit 404 combines a plurality of output subsets belonging to the same pair of sorted sets before the division and acquires one output set.

An operation of the parallel union control device will be viewed with a specific example. It is assumed that three pairs of sets being first to third pairs (XA, YA), (XB, YB), (XC, YD) are input sets. It is assumed that the sum of the numbers of elements in each pair is 1,000 for the first pair (XA, YA), 2,000 for the second pair (XB, YB), and 5,000 for the third pair (XC, YC). At this time, the number of divisions for each pair is proportionated to the sum of the numbers of elements and also the sum of the numbers of divisions is equalized to the vector length (assumed to be 8 in this case).

In this case, each number of divisions becomes 1 for the first pair (XA, YA), 2 for the second pair (XB, YB), and 5 for the third pair (XC, YC). The number of divisions is 1 for the first pair (XA, YA), and therefore division is not performed. The second pair (XB, YB) is divided into two parts being (XB1, YB1) and (XB2, YB2). The third pair (XC, YC) is divided into five parts being (XC1, YC1), . . . , (XC5, YC5). The results of parallel union processing on the divisions are respectively denoted as (XA, YA)→ZA, (XB1, YB1)→ZB1, . . . , (XC1, YC1)→ZC1, . . . . Output subsets undergoing the union processing and belonging to the same sorted set before the division are combined. In other words, ZB1 and ZB2 are combined into ZB, and also ZC1, . . . , ZC5 are combined into ZC. Accordingly, the parallel union control device 400 takes (XA, YA), (XB, YB), and (XC, YC) as input sets and outputs output sets ZA, ZB, and ZC as a result of the union processing.

Description of Operation

Figure 18:
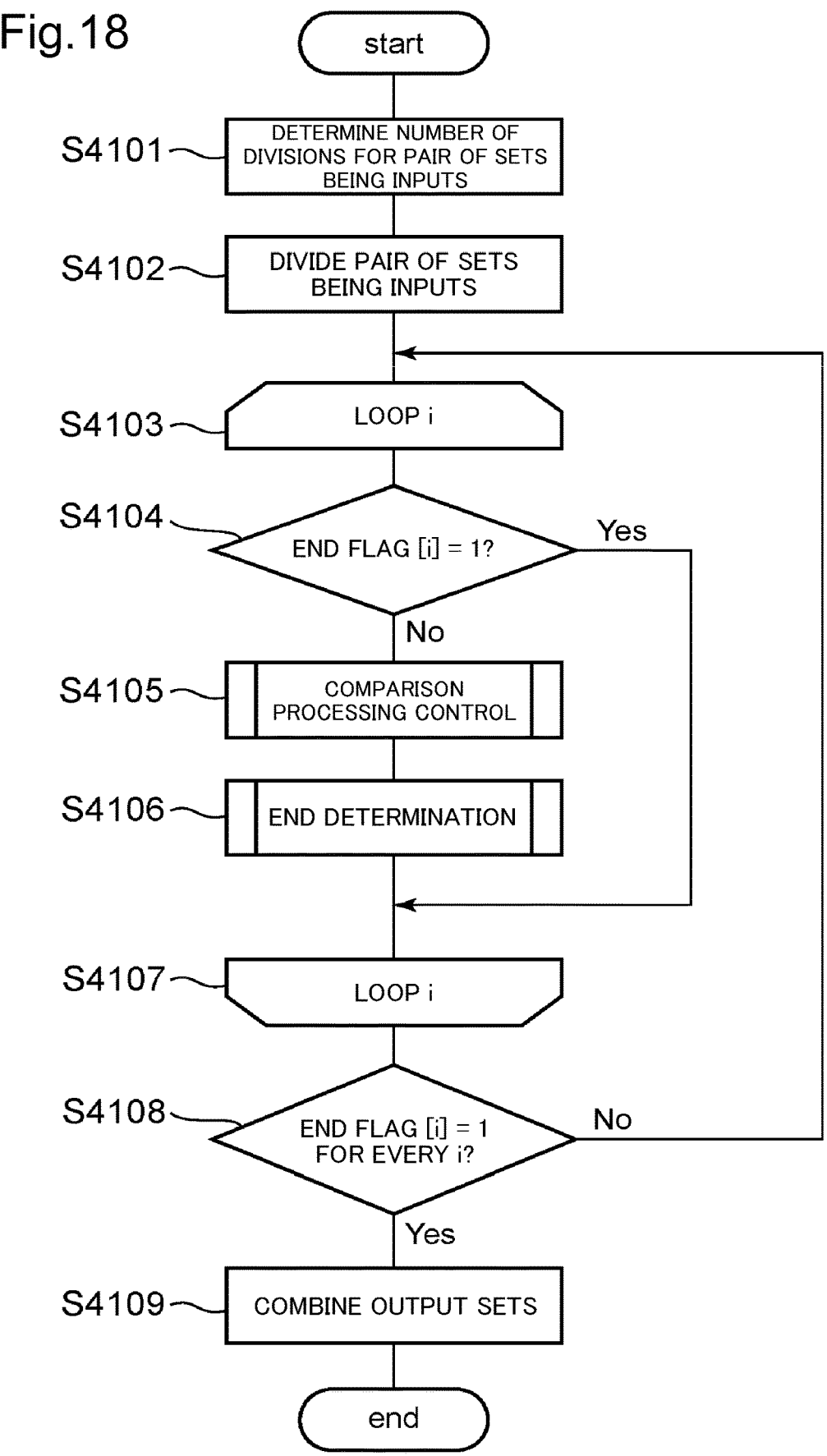
FIG. 18 is a flowchart for illustrating an operation of the parallel union control device illustrated in FIG. 17.

FIG. 18 is a flowchart for illustrating an operation of the parallel union control device 400.

In Step S4101, the number-of-divisions determination unit 405 determines the number of divisions for each pair of sorted sets being inputs.

In Step S4102, based on the number of divisions determined by the number-of-divisions determination unit 405, the set division-combination unit 404 divides a pair of sorted sets.

A loop from Step S4103 to Step S4108 is the same loop from Step S1101 to Step S1106 according to the first example embodiment illustrated in FIG. 6, and therefore description thereof is omitted.

In Step S4109, the set division-combination unit 404 combines sorted sets undergoing the union processing belonging to the same sorted sets before the division.
Description of Effects Next, an effect of the sixth example embodiment will be described.

The sixth example embodiment enables high-speed execution of the union processing on sorted sets (input sets) by use of the vector arithmetic unit (core) A110 in the vector computer (parallel computer) A100.

Seventh Example Embodiment

Next, a multi-union-control device according to a seventh example embodiment of the present invention will be described.

A function of the multi-union-control device will be briefly described. By repeatedly using a parallel union control device 400, the multi-union-control device takes a plurality of sorted sets as inputs and outputs only one sorted set as a result of the union processing.

Description of Configuration FIG. 19 is a block diagram illustrating a configuration of a multi-union-control device 4000 according to the seventh example embodiment of the present invention.

The multi-union-control device 4000 includes the parallel union control device 400, a process completion determination unit 4010, and a set pair generation unit 4020.

The process completion determination unit 4010 determines whether the number of target sorted sets is 1, and when the number is 1, ends entire processing, otherwise the process completion determination unit 4010 repeats the union processing.

The set pair generation unit 4020 generates a predetermined number of pairs of sorted sets from a plurality of target sorted sets and takes the pairs as inputs to the parallel union control device 400.
Description of Operation FIG. 20 is a flowchart for illustrating an operation of the multi-union-control device 4000.

Figure 20:
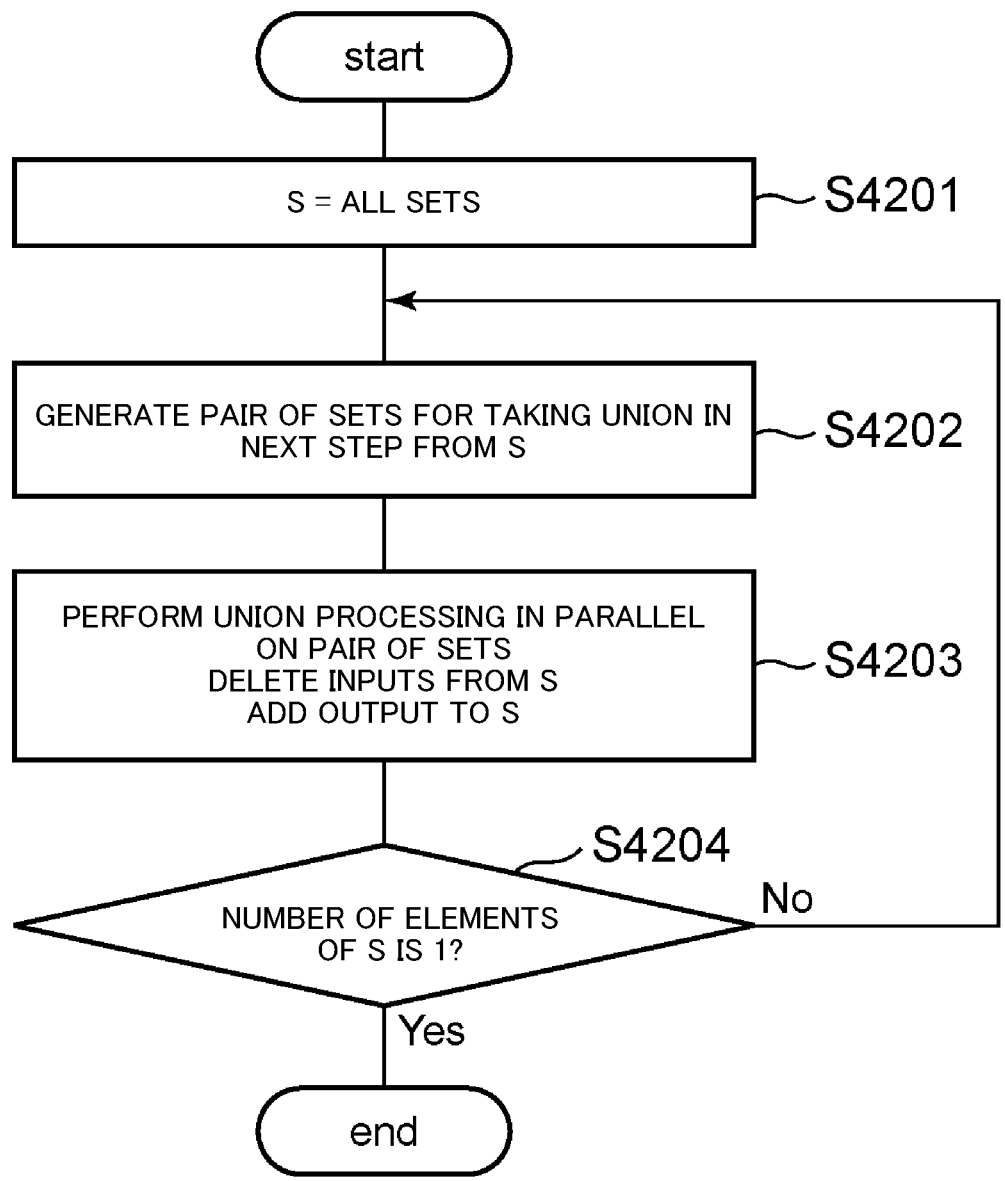
FIG. 20 is a flowchart for illustrating an operation of entire processing by the multi-union-control device illustrated in FIG. 19.

The flowchart in FIG. 20 is basically the same as that in FIG. 10, and therefore only the difference will be mentioned below.

In Step S4202, the set pair generation unit 4020 generates a predetermined number of pairs of sets from all sorted sets S. S is a set of sorted sets being targets of the union processing.

In Step S4203, the union processing is performed on the predetermined number of pairs of sets by use of the parallel union control device 400. The input sorted sets (input sets) are deleted from the all sorted sets S, and the output sorted set (output set) is added to the all sorted sets S.
Description of Effects Next, an effect of the seventh example embodiment will be described.

The seventh example embodiment enables high-speed execution of the union processing on sorted sets (input sets) by use of the vector arithmetic unit (core) A110 in the vector computer (parallel computer) A100.

Each unit in the parallel union control devices 100, 200, and 400 according to the aforementioned first, third and sixth example embodiments may be provided by use of a combination of hardware and software. In the form of combining hardware with software, a parallel union control program is loaded into a random access memory (RAM), and the units are provided as various means by operating hardware of an information processing device (computer) such as a central processing unit (CPU) in accordance with the parallel union control program. The parallel union control program may be distributed by being recorded on a storage medium. The parallel union control program recorded on the storage medium is read into a memory in a wired or wireless manner, or through the storage medium itself and causes a processing unit and/or the like to operate. Examples of the storage medium include an optical disk, a magnetic disk, a semiconductor memory device, and a hard disk.

Describing the aforementioned first, third, and sixth example embodiments in another expression, a computer operating as the parallel union control devices 100, 200, and 400 can be provided by causing the computer to operate as the element comparison control unit, the register input-output unit, the end determination unit, the set division-combination unit, and the number-of-divisions determination unit in accordance with the parallel union control program loaded in the RAM.

Similarly, each unit in the multi-union-control device 1000, 2000, 3000, and 4000 according to the aforementioned second, fourth, fifth, and seventh example embodiments can be provided by use of a combination of hardware and software. In the form of combining hardware with software, a multi-union-control program is loaded into a random access memory (RAM), and the units are provided as various means by operating hardware of an information processing device (computer) such as a central processing unit (CPU) in accordance with the multi-union-control program. The multi-union-control program may be distributed by being recorded on a storage medium. The multi-union-control program recorded on the storage medium is read into a memory in a wired or wireless manner, or through the storage medium itself and causes a processing unit and/or the like to operate. Examples of the storage medium include an optical disk, a magnetic disk, a semiconductor memory device, and a hard disk.

Describing the aforementioned second, fourth, fifth, and seventh example embodiments in another expression, a computer operating as the multi-union-control devices 1000, 2000, 3000, and 4000 can be provided by causing the computer to operate as the element comparison control unit, the register input-output unit, the end determination unit, the process completion determination unit, the set pair generation unit, the set division-combination unit, and the number-of-divisions determination unit in accordance with the multi-union-control program loaded on the RAM.

Figure 21:
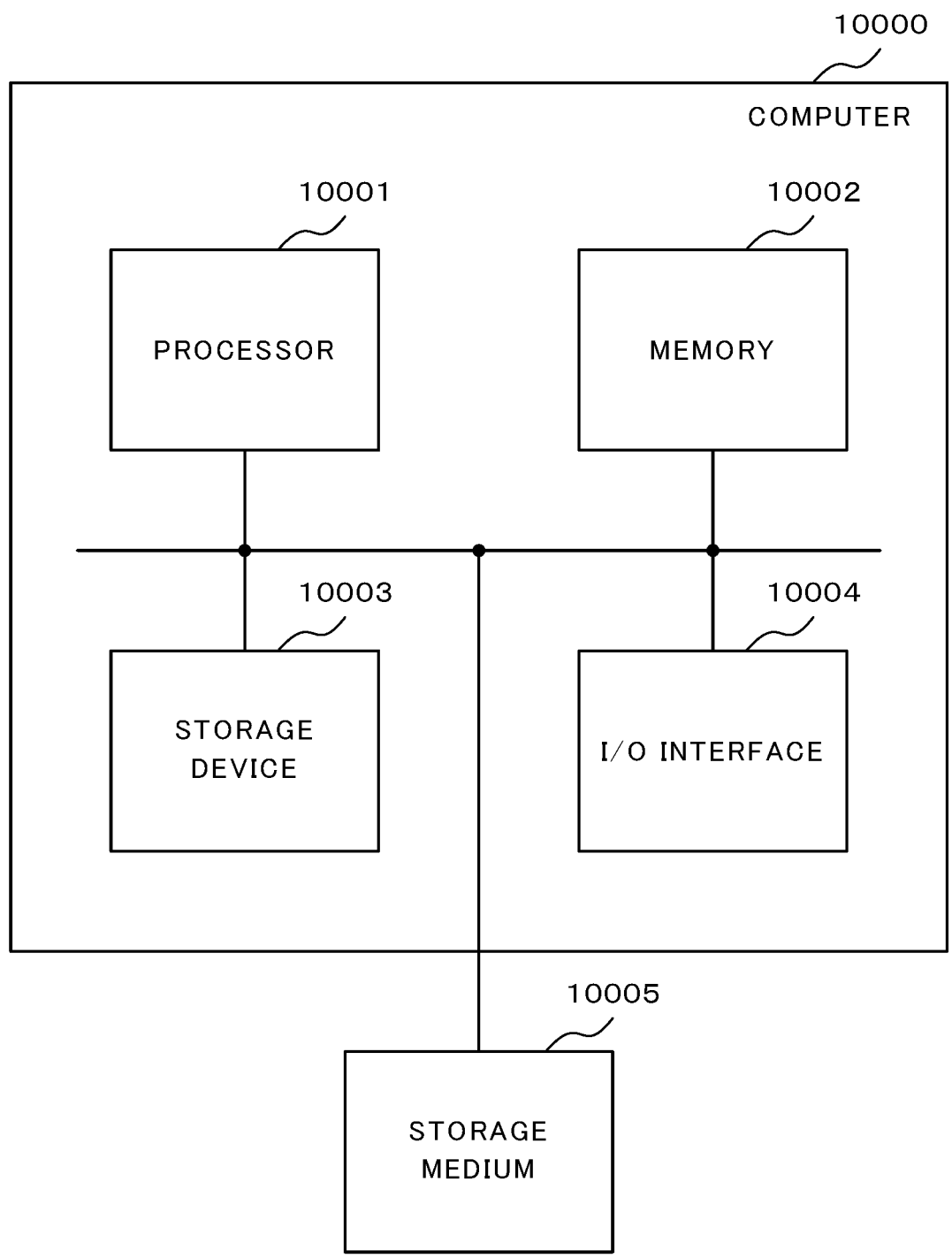
FIG. 21 is a diagram illustrating an example of a hardware configuration of a computer capable of operating as the parallel union control device and the multi-union-control device according to the example embodiments of the present invention.

FIG. 21 is a diagram illustrating an example of a hardware configuration of a computer capable of operating as the parallel union control devices according to the first, third, and sixth example embodiments of the present invention, and the multi-union-control devices according to the second, fourth, fifth, and seventh example embodiments. Referring to FIG. 21, a computer 10000 includes a processor 10001, a memory 10002, a storage device 10003, and an input/output (I/O) interface 10004. The computer 10000 can access a storage medium 10005. For example, each of the memory 10002 and the storage device 10003 is a storage device such as the aforementioned RAM or hard disk. For example, the storage medium 10005 is a storage device such as a RAM or a hard disk, a read only memory (ROM), or a portable storage medium. The storage device 10003 may be the storage medium 10005. For example, the processor 10001 is the aforementioned CPU. The processor 10001 can read and write data and a program from and into the memory 10002 and the storage device 10003. For example, the processor 10001 can access a vector computer through the I/O interface 10004. The processor 10001 can access the storage medium 10005. The storage medium 10005 stores a program causing the computer 10000 to operate as the aforementioned parallel union control device or a program causing the computer 10000 to operate as the aforementioned multi-union-control device.

The processor 10001 loads a program being stored in the storage medium 10005 and causing the computer 10000 to operate as the parallel union control device into the memory 10002. Then, by executing the program loaded in the memory 10002 by the processor 10001, the computer 10000 operates as the parallel union control device. The processor 10001 may load a program being stored in the storage medium 10005 and causing the computer 10000 to operate as the multi-union-control device into the memory 10002. Then, by executing the program loaded in the memory 10002 by the processor 10001, the computer 10000 may operate as the multi-union-control device.

For example, the element comparison control unit 101, the register input-output unit 102, and the end determination unit 103 can be provided by the processor 10001 executing a program loaded into the memory 10002 from the storage medium 10005. For example, the element comparison control unit 201, the register input-output unit 202, the end determination unit 203, and the set division-combination unit 204 can be provided by the processor 10001 executing a program loaded into the memory 10002 from the storage medium 10005. For example, the element comparison control unit 401, the register input-output unit 402, the end determination unit 403, the set division-combination unit 404, and the number-of-divisions determination unit 405 can be provided by the processor 10001 executing a program loaded into the memory 10002 from the storage medium 10005. For example, the process completion determination unit 1010, the first pointer register 1011, the second pointer register 1012, the pointer control unit 1014, and the set pair generation unit 1020 can be provided by the processor 10001 executing a program loaded into the memory 10002 from the storage medium 10005. For example, the process completion determination unit 2010 and the set pair generation unit 2020 can be provided by the processor 10001 executing a program loaded into the memory 10002 from the storage medium 10005. For example, the process completion determination unit 3010 and the set pair generation unit 3020 can be provided by the processor 10001 executing a program loaded into the memory 10002 from the storage medium 10005. For example, the union control device switching unit 3100, the process completion determination unit 4010, and the set pair generation unit 4020 can be provided by the processor 10001 executing a program loaded into the memory 10002 from the storage medium 10005.

A part or the whole of the element comparison control unit 101, the register input-output unit 102, and the end determination unit 103 can also be provided by dedicated circuitry. A part or the whole of the element comparison control unit 201, the register input-output unit 202, the end determination unit 203, and the set division-combination unit 204 can also be provided by dedicated circuitry. A part or the whole of the element comparison control unit 401, the register input-output unit 402, the end determination unit 403, the set division-combination unit 404, and the number-of-divisions determination unit 405 can also be provided by dedicated circuitry. A part or the whole of the process completion determination unit 1010, the first pointer register 1011, the second pointer register 1012, the pointer control unit 1014, and the set pair generation unit 1020 can also be provided by dedicated circuitry. A part or the whole of the process completion determination unit 2010 and the set pair generation unit 2020 can also be provided by dedicated circuitry. A part or the whole of the process completion determination unit 3010 and the set pair generation unit 3020 can also be provided by dedicated circuitry. A part or the whole of the union control device switching unit 3100, the process completion determination unit 4010 and the set pair generation unit 4020 can also be provided by dedicated circuitry.

As described above, while the parallel union control devices 100, 200, and 400 and the multi-union-control devices 1000, 2000, 3000, and 4000, according to the present example embodiment, are software-related inventions, the devices provide an effect of enabling the vector computer A100 to execute high-speed union processing in parallel, and therefore it is obvious that the devices improve (enhance) a computer-related technology and do not fall under an abstract concept.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part or the whole of the aforementioned example embodiments may also be described as the following Supplementary Notes but are not limited thereto.

(Supplementary Note 1)

A parallel union control device that, by use of a parallel computer including N arithmetic units (where N is an integer equal to or more than 2) and a vector register, causes 2N input sets each of which being a sorted set to undergo union processing in parallel for each pair and causes N output sets each of which being a sorted set to be output, the parallel union control device including:

an element comparison control means for causing each of the N arithmetic units to successively compare input elements of a pair of input sets to undergo union processing, the pair being stored in an input operand register in the vector register, select one of the input elements as an output element of an output set, based on a comparison result, and store the output element into an output operand register in the vector register, and also shifting a pointer pointing to the input element;

a register input-output means for loading the 2N input sets into the input operand register from a memory and also storing the N output sets into the memory from the output operand register; and an end determination means for determining whether union processing performed in parallel is ended.

(Supplementary Note 2)

The parallel union control device according to Supplementary Note 1, wherein the sorted set is a set in which one or more elements are arranged in ascending order, and the element comparison control means causes the arithmetic unit to select a smaller input element as the output element and increments a pointer pointing to the smaller input element when the comparison result indicates inequality, and causes the arithmetic unit to select the input element as the output element and increments pointers pointing to both input elements when the comparison result indicates equality.

(Supplementary Note 3)

The parallel union control device according to Supplementary Note 1 or 2, further including a set division-combination means for dividing the input set into a plurality of input subsets and causing the element comparison control means to perform control in such a way as to output a plurality of output subsets in place of the output set from the N arithmetic units by use of a pair of input subsets in place of the pair of input sets, and also acquiring the output set by combining the plurality of output subsets.

(Supplementary Note 4)

The parallel union control device according to Supplementary Note 3, further including a number-of-divisions determination means for determining a number of divisions of the plurality of input subsets, wherein the set division-combination means divides the input set into the plurality of input subsets, based on a determined number of divisions, and combines the plurality of output subsets into the output set.

(Supplementary Note 5)

A multi-union-control device that, by use of a parallel computer including N arithmetic units (where N is an integer equal to or more than 2) and a vector register, repeatedly causes 2N input sets each of which being a sorted set to undergo union processing in parallel for each pair, and finally causes an output set including one sorted set to be output, the multi-union-control device including:

the parallel union control device according to any one of Supplementary Notes 1 to 4;

a set pair generation means for generating a pair of input sets being inputs to parallel union processing, and storing a generated pair of input sets into the input operand register; and a process completion determination means for determining whether entire union processing is completed.

(Supplementary Note 6)

A multi-union-control device that, by use of a parallel computer including N arithmetic units (where N is an integer equal to or more than 2) and a vector register, repeatedly causes 2N input sets each of which being a sorted set to undergo union processing in parallel for each pair, and finally causes an output set including one sorted set to be output, the multi-union-control device including:

a first parallel union control device and a second parallel union control device each of which being the parallel union control device according to Supplementary Note 1;

a set pair generation means for generating a pair of input sets being inputs to parallel union processing, and storing a generated pair of input sets into the input operand register;

a union control device switching means for switching between the first parallel union control device and the second parallel union control device; and a process completion determination means for determining whether entire union processing is completed, wherein the second parallel union control device further includes a set division-combination means for dividing the input set into a plurality of input subsets and causing the element comparison control means to perform control in such a way as to output a plurality of output subsets in place of the output set from the N arithmetic units by use of a pair of input subsets in place of the pair of input sets, and also acquiring the output set by combining the plurality of output subsets.

(Supplementary Note 7)

The multi-union-control device according to Supplementary Note 6, wherein the second parallel union control device further includes a number-of-divisions determination means for determining a number of divisions of the plurality of input subsets, and the set division-combination means divides the input set into the plurality of input subsets, based on a determined number of divisions, and combines the plurality of output subsets into the output set.

(Supplementary Note 8)

A parallel union control method for, by use of a parallel computer including N arithmetic units (where N is an integer equal to or more than 2) and a vector register, causing 2N input sets each of which being a sorted set to undergo union processing in parallel for each pair and causing N output sets each of which being a sorted set to be output, the parallel union control method performing, by an information processing device:

element comparison control of causing each of the N arithmetic units to successively compare input elements of a pair of input sets to undergo union processing, the pair being stored in an input operand register in the vector register, select one of the input elements as an output element of an output set, based on a comparison result, and store the output element into an output operand register in the vector register, and also shifting a pointer pointing to the input element;

register input-output of loading the 2N input sets into the input operand register from a memory and also storing the N output sets into the memory from the output operand register; and end determination of determining whether union processing performed in parallel is ended.

(Supplementary Note 9)

The parallel union control method according to Supplementary Note 8, wherein the sorted set is a set in which one or more elements are arranged in ascending order, and the element comparison control causes the arithmetic unit to select a smaller input element as the output element and increments a pointer pointing to the smaller input element when the comparison result indicates inequality, and causes the arithmetic unit to select the input element as the output element and increments pointers pointing to both input elements when the comparison result indicates equality.

(Supplementary Note 10)

The parallel union control method according to Supplementary Note 8 or 9, further including, by the information processing device, dividing the input set into a plurality of input subsets and, in the element comparison control, performing control in such a way that a plurality of output subsets are output in place of the output set from the N arithmetic units by use of a pair of input subsets in place of the pair of input sets, and also acquiring the output set by combining the plurality of output subsets.

(Supplementary Note 11)

The parallel union control method according to Supplementary Note 10, further including, by the information processing device, determining a number of divisions of the plurality of input subsets, wherein dividing and combining the set includes dividing the input set into the plurality of input subsets, based on a determined number of divisions, and combining the plurality of output subsets into the output set.

(Supplementary Note 12)

A multi-union-control method for, by use of a parallel computer including N arithmetic units (where N is an integer equal to or more than 2) and a vector register, repeatedly causing 2N input sets each of which being a sorted set to undergo union processing in parallel for each pair and finally causing an output set including one sorted set to be output, the multi-union-control method including, by an information processing device:

performing the parallel union control method according to any one of Supplementary Notes 8 to 11;

generating a pair of input sets being inputs to parallel union processing, and storing a generated pair of input sets into the input operand register; and determining whether entire union processing is completed.

(Supplementary Note 13)

A multi-union-control method for, by use of a parallel computer including N arithmetic units (where N is an integer equal to or more than 2) and a vector register, repeatedly causing 2N input sets each of which being a sorted set to undergo union processing in parallel for each pair, and finally causing an output set including one sorted set to be output, the multi-union-control method including, by an information processing device:

performing a first parallel union control method and a second parallel union control method each of which being the parallel union control method according to Supplementary Note 8;

generating a pair of input sets being inputs to parallel union processing, and storing a generated pair of input sets into the input operand register;

switching between the first parallel union control method and the second parallel union control method; and determining whether entire union processing is completed, wherein the second parallel union control method further divides the input set into a plurality of input subsets and, in the element comparison control, causes control to be performed in such a way that a plurality of output subsets are output in place of the output set from the N arithmetic units by use of a pair of input subsets in place of the pair of input sets, and also acquires the output set by combining the plurality of output subsets.

(Supplementary Note 14)

The multi-union-control method according to Supplementary Note 13, wherein, by an information processing device, the second parallel union control method
  determines a number of divisions of the plurality of input subsets, and
  divides the input set into the plurality of input subsets, based on a determined number of divisions, and combines the plurality of output subsets into the output set.

(Supplementary Note 15)

A storage medium having a parallel union control program stored thereon, the parallel union control program causing a computer to, by use of a parallel computer including N arithmetic units (where N is an integer equal to or more than 2) and a vector register, perform union processing on 2N input sets each of which being a sorted set in parallel for each pair and output N output sets each of which being a sorted set, the parallel union control program causing the computer to execute:

element comparison control processing of causing each of the N arithmetic units to successively compare input elements of a pair of input sets to undergo union processing, the pair being stored in an input operand register in the vector register, select one of the input elements as an output element of an output set, based on a comparison result, and store the output element into an output operand register in the vector register, and also shifting a pointer pointing to the input element;

register input-output processing of loading the 2N input sets into the input operand register from a memory and also storing the N output sets into the memory from the output operand register; and end determination processing of determining whether union processing performed in parallel is ended.

(Supplementary Note 16)

The storage medium according to Supplementary Note 15, wherein the sorted set is a set in which one or more elements are arranged in ascending order, and the element comparison control processing causes the computer to, when the comparison result indicates inequality, cause the arithmetic unit to select a smaller input element as the output element, and increment a pointer pointing to the smaller input element, and, when the comparison result indicates equality, cause the arithmetic unit to select the input element as the output element, and increment pointers pointing to both input elements.

(Supplementary Note 17)

The storage medium according to Supplementary Note 15 or 16, further causing the computer to execute set division-combination processing of dividing the input set into a plurality of input subsets and causing the element comparison control processing to perform control in such a way as to output a plurality of output subsets in place of the output set from the N arithmetic units by use of a pair of input subsets in place of the pair of input sets, and also acquiring the output set by combining the plurality of output subsets.

(Supplementary Note 18)

The storage medium according to Supplementary Note 17, further causing the computer to execute number-of-divisions determination processing of determining a number of divisions of the plurality of input subsets, wherein the set division-combination processing causes the computer to divide the input set into the plurality of input subsets, based on a determined number of divisions, and combine the plurality of output subsets into the output set.

(Supplementary Note 19)

A storage medium having a multi-union-control program stored thereon, the multi-union-control program causing a computer to, by use of a parallel computer including N arithmetic units (where N is an integer equal to or more than 2) and a vector register, repeatedly perform union processing on 2N input sets each of which being a sorted set in parallel for each pair and finally output an output set including one sorted set, the multi-union-control program:

including a parallel union control program stored in the storage medium according to any one of Supplementary Notes 15 to 18; and
  causing the computer to execute:
  set pair generation processing of generating a pair of input sets being inputs to parallel union processing, and storing a generated pair of input sets into the input operand register; and
  process completion determination processing of determining whether entire union processing is completed.

(Supplementary Note 20)

A storage medium having a multi-union-control program stored thereon, the multi-union-control program causing a computer to, by use of a parallel computer including N arithmetic units (where N is an integer equal to or more than 2) and a vector register, repeatedly perform union processing on 2N input sets each of which being a sorted set in parallel for each pair and finally output an output set including one sorted set, the multi-union-control program:

including a first parallel union control program and a second parallel union control program each of which being a parallel union control program stored in the storage medium according to Supplementary Note 15; and causing the computer to execute:
set pair generation processing of generating a pair of input sets being inputs to parallel union processing, and storing a generated pair of input sets into the input operand register;
union control program switching processing of switching between the first parallel union control program and the second parallel union control program; and
process completion determination processing of determining whether entire union processing is completed, wherein
the second parallel union control program further causes the computer to execute set division-combination processing of dividing the input set into a plurality of input subsets and causing the element comparison control processing to perform control in such a way as to output a plurality of output subsets in place of the output set from the N arithmetic units by use of a pair of input subsets in place of the pair of input sets, and also acquiring the output set by combining the plurality of output subsets.

(Supplementary Note 21)
The storage medium according to Supplementary Note 20, wherein
the second parallel union control program further causes the computer to execute number-of-divisions determination unit processing of determining a number of divisions of the plurality of input subsets, and
the set division-combination processing divides the input set into the plurality of input subsets, based on a determined number of divisions, and combines the plurality of output subsets into the output set.

REFERENCE SIGNS LIST

A100 Vector computer
A110 Vector arithmetic unit
A1100 Arithmetic unit
A1102 Comparator
A1104 Selector
A120 Vector register
A121 First input operand register
A122 Second input operand register
A124 Output operand register
A130 Mask register
B100 Memory (main storage device)
C100 Control device
100 Parallel union control device
101 Element comparison control unit
102 Register input-output unit
103 End determination unit
200 Parallel union control device
201 Element comparison control unit
202 Register input-output unit
203 End determination unit
204 Set division-combination unit
400 Parallel union control device
401 Element comparison control unit
402 Register input-output unit
403 End determination unit
404 Set division-combination unit
405 Number-of-divisions determination unit
1000 Multi-union-control device
1010 Process completion determination unit
1011 First pointer register
1012 Second pointer register
1014 Pointer control unit
1020 Set pair generation unit
2000 Multi-union-control device
2010 Process completion determination unit
2020 Set pair generation unit
3000 Multi-union-control device
3010 Process completion determination unit
3020 Set pair generation unit
3100 Union control device switching unit
4000 Multi-union-control device
4010 Process completion determination unit
4020 Set pair generation unit
10000 Computer
10001 Processor
10002 Memory
10003 Storage device
10004 I/O interface
10005 Storage medium

The invention claimed is:

1. A parallel union control device, comprising:
at least one memory storing a set of instructions; and
at least one processor configured to execute the set of instructions to
cause a parallel computer including a plurality of arithmetic units and a vector register to:
perform union processing on pairs of input sets in parallel among the pairs, each of the input unit pairs being a sorted set; and
output output sets each being stored sets, wherein
the at least one processor is configured to execute the set of instructions to:
cause each of the plurality of arithmetic units to:
successively compare input elements of a pair of input sets to undergo union processing, the pair being stored in an input operand register in the vector register;
select one of the input elements as an output element of an output set, based on a comparison result; and
store the output element into an output operand register in the vector register;
shift a pointer pointing to the input element;
load the input sets into the input operand register from a memory;
store the output sets into the memory from the output operand register; and
determine whether union processing performed in parallel is ended.

2. The parallel union control device according to claim 1, wherein
the sorted set is a set in which one or more elements are arranged in ascending order, and
the at least one processor is further configured to execute the set of instructions to:
perform:
causing an arithmetic unit of the plurality of the arithmetic units to select a smaller input element as the output element; and
incrementing a pointer pointing to the smaller input element when the comparison result indicates inequality and perform:
  causing the arithmetic unit to select the input element as the output element; and
  incrementing pointers pointing to both input elements when the comparison result indicates equality.

3. The parallel union control device according to claim 1, wherein, further comprising
  the at least one processor is further configured to execute the set of instructions to:
  divide the input set into a plurality of input subsets;
  performing control in such a way as to output a plurality of output subsets in place of the output set from the plurality of arithmetic units by use of a pair of input subsets in place of the pair of input sets; and
  acquire the output set by combining the plurality of output subsets.

4. The parallel union control device according to claim 3, wherein
  the at least one processor is further configured to execute the set of instructions to:
  determine a number of divisions of the plurality of input subsets;
  divide the input set into the plurality of input subsets, based on a determined number of divisions; and
  combine the plurality of output subsets into the output set.

5. A multi-union-control device including the parallel union control device according to claim 1, the multi-union-control device comprising:
  at least one second memory storing a second set of instructions; and
  at least one second processor configured to execute the second set of instructions to:
  repeatedly cause the parallel computer to perform the union processing; and
  cause the parallel computer to output a final output set including one sorted set, wherein
  the at least one second processor to execute the second set of instructions to:
  generate a pair of input sets being inputs to parallel union processing;
  store a generated pair of input sets into the input operand register; and
  determine whether entire union processing is completed.

6. A multi-union-control device including a first parallel union control device and a second parallel union control device each of which is the parallel union control device according to claim 1, the multi-union-control device comprising:
  at least one second memory storing a second set of instructions; and
  at least one second processor configured to execute the second set of instructions to:
  repeatedly cause the parallel computer to perform the union processing; and
  cause the parallel computer to output a final output set including one sorted set, wherein
  the at least one second processor to execute the second set of instructions to:
  generate a pair of input sets being inputs to parallel union processing;
  store a generated pair of input sets into the input operand register;
  switch between the first parallel union control device and the second parallel union control device; and
  determine whether entire union processing is completed, wherein
  the at least one processor of the second parallel union control device is configured to execute the instructions to:
  divide the input set into a plurality of input subsets;
  perform control in such a way as to output a plurality of output subsets in place of the output set from the plurality of arithmetic units by use of a pair of input subsets in place of the pair of input sets; and
  acquire the output set by combining the plurality of output subsets.

7. The multi-union-control device according to claim 6, wherein
  the at least one processor of the second parallel union control device is configured to execute the instructions to
  determine a number of divisions of the plurality of input subsets;
  divide the input set into the plurality of input subsets, based on a determined number of divisions; and
  combine the plurality of output subsets into the output set.

8. A parallel union control method for, comprising:
  causing a parallel computer including a plurality of arithmetic units and a vector register to:
  perform union processing on pairs of input sets in parallel among the pairs, each of the input unit pairs being a sorted set; and
  output output sets each being stored sets, wherein
  the method includes:
  causing each of the plurality of arithmetic units to:
  successively compare input elements of a pair of input sets to undergo union processing, the pair being stored in an input operand register in the vector register;
  select one of the input elements as an output element of an output set, based on a comparison result; and
  store the output element into an output operand register in the vector register;
  shifting a pointer pointing to the input element;
  loading the input sets into the input operand register from a memory;
  storing the output sets into the memory from the output operand register; and
  determining whether union processing performed in parallel is ended.

9. The parallel union control method according to claim 8, wherein
  the sorted set is a set in which one or more elements are arranged in ascending order, and
  the method includes:
  performing:
    causing an arithmetic unit of the plurality of the arithmetic units to select a smaller input element as the output element; and
    incrementing a pointer pointing to the smaller input element when the comparison result indicates inequality; and
  performing:
    causing the arithmetic unit to select the input element as the output element, and
    incrementing pointers pointing to both input elements when the comparison result indicates equality.

10. The parallel union control method according to claim 8, further comprising:
  dividing the input set into a plurality of input subsets; and
  performing control in such a way that a plurality of output subsets are output in place of the output set from the the plurality of arithmetic units by use of a pair of input subsets in place of the pair of input sets; and acquiring the output set by combining the plurality of output subsets.

11. The parallel union control method according to claim 10, further comprising;

determining a number of divisions of the plurality of input subsets, wherein the dividing the input set includes dividing the input set into the plurality of input subsets, based on a determined number of divisions, and the method further includes combining the plurality of output subsets into the output set.

12. A multi-union-control method including the parallel union control method according to claim 8, the multi-union-control method comprising:

repeatedly causing the parallel computer to perform the union processing; and causing the parallel computer to output a final output set including one sorted set, wherein the multi-union-control method further including:

generating a pair of input sets being inputs to parallel union processing;

storing a generated pair of input sets into the input operand register; and determining whether entire union processing is completed.

13. A multi-union-control method including a first parallel union control method and a second parallel union control method each of which is the parallel union control method according to claim 8, the multi-union-control method comprising:

repeatedly causing the parallel computer to perform the union processing; and causing the parallel computer to output a final output set including one sorted set, wherein the multi-union-control method further includes:

generating a pair of input sets being inputs to parallel union processing;

storing a generated pair of input sets into the input operand register;

switching between the first parallel union control method and the second parallel union control method; and determining whether entire union processing is completed, wherein the second parallel union control method further includes:

dividing the input set into a plurality of input subsets;

performing control in such a way that a plurality of output subsets are output in place of the output set from the plurality of arithmetic units by use of a pair of input subsets in place of the pair of input sets; and acquiring the output set by combining the plurality of output subsets.

14. The multi-union-control method according to claim 13, wherein the second parallel union control method includes:

determining a number of divisions of the plurality of input subsets, and dividing the input set into the plurality of input subsets, based on a determined number of divisions and combining the plurality of output subsets into the output set.

15. A non-transitory computer readable storage medium storing a parallel union control program causing a controller computer to execute:

processing of causing a parallel computer including a plurality of arithmetic units and a vector register to:

perform union processing on pairs of input sets in parallel among the pairs, each of the input unit pairs being a sorted set; and output output sets each being stored sets, wherein the program further causing the controller computer to execute:

element comparison control processing of causing each of the plurality of arithmetic units to:

successively compare input elements of a pair of input sets to undergo union processing, the pair being stored in an input operand register in the vector register;

select one of the input elements as an output element of an output set, based on a comparison result; and store the output element into an output operand register in the vector register;

processing of shifting a pointer pointing to the input element;

register input-output processing of loading the input sets into the input operand register from a memory;

processing of storing the output sets into the memory from the output operand register; and end determination processing of determining whether union processing performed in parallel is ended.

16. The storage medium according to claim 15, wherein the sorted set is a set in which one or more elements are arranged in ascending order, the element comparison control processing performs:

causing an arithmetic unit of the plurality of the arithmetic units to select a smaller input element as the output element; and increment a pointer pointing to the smaller input element when the comparison result indicates inequality, and the element comparison control processing performs:

causing the arithmetic unit to select the input element as the output element; and increment pointers pointing to both input elements when the comparison result indicates equality.

17. The storage medium according to claim 15, the program further causing the controller computer to execute set division-combination processing that performs:

dividing the input set into a plurality of input subsets;

causing the element comparison control processing to perform control in such a way as to output a plurality of output subsets in place of the output set from the plurality of arithmetic units by use of a pair of input subsets in place of the pair of input sets; and acquiring the output set by combining the plurality of output subsets.

18. The storage medium according to claim 17, the program further causing the controller computer to execute number-of-divisions determination processing of determining a number of divisions of the plurality of input subsets, wherein the set division-combination processing performs:

dividing the input set into the plurality of input subsets, based on a determined number of divisions; and combining the plurality of output subsets into the output set.

19. A non-transitory computer readable storage medium storing a multi-union-control program including the parallel union control program stored in the storage medium according to claim 15, the multi-union-control program causing the controller computer to execute:

processing of repeatedly causing the parallel computer to perform the union processing; and processing of causing the parallel computer to output a final output set including one sorted set, wherein the multi-union-control program causes the computer to execute:

set pair generation processing of generating a pair of input sets being inputs to parallel union processing, and storing a generated pair of input sets into the input operand register; and process completion determination processing of determining whether entire union processing is completed.

20. A non-transitory computer readable storage medium storing a multi-union-control program including a first parallel union control program and a second parallel union control program each of which is the parallel union control program stored in the storage medium according to claim 15, the multi-union-control program causing the controller computer to execute:

processing of repeatedly causing the parallel computer to perform the union processing; and processing of causing the parallel computer to output a final output set including one sorted set, wherein the multi-union-control program causes the computer to execute:

set pair generation processing of generating a pair of input sets being inputs to parallel union processing, and storing a generated pair of input sets into the input operand register;

union control program switching processing of switching between the first parallel union control program and the second parallel union control program; and process completion determination processing of determining whether entire union processing is completed, wherein the second parallel union control program further causes the computer to execute set division-combination processing that performs:

dividing the input set into a plurality of input subsets;

causing the element comparison control processing to perform control in such a way as to output a plurality of output subsets in place of the output set from the plurality of arithmetic units by use of a pair of input subsets in place of the pair of input sets; and acquiring the output set by combining the plurality of output subsets.

\* \* \* \* \*